United States Patent
Ghatage et al.

(10) Patent No.: US 10,318,593 B2
(45) Date of Patent: Jun. 11, 2019

(54) EXTRACTING SEARCHABLE INFORMATION FROM A DIGITIZED DOCUMENT

(71) Applicant: ACCENTURE GLOBAL SOLUTIONS LIMITED, Dublin (IE)

(72) Inventors: Prakash Ghatage, Bangalore (IN); Nirav Sampat, Mumbai (IN); Kumar Viswanathan, Bangalore (IN); Suvendu Kumar Mahapatra, Chennai (IN); Srikanth Narayanan, Chennai (IN); Rekha Mani, Chennai (IN); Aravind Krishnan, Chennai (IN); Rahul Kotnala, Dehradun (IN); Kameshkumar Lakshminarayanan, Cuddalore (IN); Ashish Jain, Chennai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 15/681,833

(22) Filed: Aug. 21, 2017

(65) Prior Publication Data
US 2018/0373711 A1    Dec. 27, 2018

(30) Foreign Application Priority Data
Jun. 21, 2017  (IN) .............................. 201741021754

(51) Int. Cl.
*G06F 16/93*       (2019.01)
*G06F 16/174*      (2019.01)
(Continued)

(52) U.S. Cl.
CPC .............. *G06F 16/93* (2019.01); *G06F 16/13* (2019.01); *G06F 16/1748* (2019.01); *G06F 17/30011* (2013.01); *G06F 17/30091* (2013.01); *G06F 17/30156* (2013.01); *G06K 9/00449* (2013.01); *G06K 9/00456* (2013.01); *G06K 9/00483* (2013.01); *G06K 9/2081* (2013.01); *G06K 9/66* (2013.01); *G06N 20/00* (2019.01);
(Continued)

(58) Field of Classification Search
None
See application file for complete search history.

(56) References Cited

U.S. PATENT DOCUMENTS 8,463,790 B1 *  6/2013  Joshi ................. G06F 17/30011
                                                      707/738
2005/0065975 A1 *  3/2005  McDonald .......... G06F 17/2705
(Continued)

*Primary Examiner* — Miya J Williams
(74) *Attorney, Agent, or Firm* — Mannava & Kang, P.C.

(57) ABSTRACT

Data extraction and automatic validation from digitized documents in non-editable formats is disclosed. Paper documents are digitized or converted into formats suitable for storage on computers or other digital devices. The digitized documents are classified into one of a plurality of document types and based on the document type, document processing rules are selected for analyzing the digitized documents to enable data extraction and automatic validation. The positions and values of the data fields in the digitized documents are obtained using machine learning techniques. The data field values are automatically validated and assigned confidence scores. Data fields with low confidence scores are flagged for manual review.

18 Claims, 19 Drawing Sheets

(51) Int. Cl.
   *G06F 16/13*   (2019.01)
   *G06K 9/00*    (2006.01)
   *H04N 1/04*    (2006.01)
   *G06F 17/30*   (2006.01)
   *G06N 99/00*   (2019.01)
   *G06K 9/66*    (2006.01)
   *H04N 1/21*    (2006.01)
   *G06K 9/20*    (2006.01)
   *G06N 20/00*   (2019.01)

(52) U.S. Cl.
   CPC ............. *G06N 99/005* (2013.01); *H04N 1/04* (2013.01); *H04N 1/2166* (2013.01); *H04N 2201/0081* (2013.01); *H04N 2201/0087* (2013.01); *H04N 2201/218* (2013.01)

(56) References Cited

U.S. PATENT DOCUMENTS

| | | | | |
|---|---|---|---|---|
| 2006/0290999 A1* | 12/2006 | Ebitani | ............ | G09B 7/02 358/426.06 |
| 2007/0285722 A1* | 12/2007 | Koyama | ............ | G06K 9/00456 358/1.18 |
| 2011/0078114 A1* | 3/2011 | Herbeck | ............ | G06F 17/30011 707/638 |
| 2012/0105918 A1* | 5/2012 | Fan | ............ | G06K 9/3208 358/462 |
| 2015/0046659 A1* | 2/2015 | Wu | ............ | G06F 17/30159 711/137 |
| 2015/0281515 A1* | 10/2015 | Honda | ............ | H04N 1/393 358/1.2 |
| 2017/0180571 A1* | 6/2017 | Inomata | ............ | G06K 9/00449 |
| 2017/0212951 A1* | 7/2017 | Wenzler | ............ | G06Q 10/00 |

* cited by examiner

EXTRACTING SEARCHABLE INFORMATION FROM A DIGITIZED DOCUMENT

CROSS REFERENCE TO RELATED APPLICATIONS

The present application claims priority under 35 U.S.C. 119(a)-(d) to Indian application number 201741021754, having a filing date of Jun. 21, 2017, the disclosure of which is hereby incorporated by reference in its entirety.

BACKGROUND

Forms or documents of various types are widely used for collecting information for various purposes. Commercial, educational and governmental organizations use forms for collecting information and for record keeping purposes. The advent of computers and networks resulted in the forms being moved online so that people no longer have to fill out forms on paper. Rather, people access a website and fill forms online for carrying out various activities. The online forms are endowed with attributes such as tags, markup and the like that make it easy for automatically processing data entered by the users via computers. Online forms thus received can be automatically processed to extract the data therein for storage. However, forms printed on paper continue to be extensively used for various purposes. Different document processing systems including hardware and software are developed to address processing of the paper forms that manually filled out by the users.

BRIEF DESCRIPTION OF DRAWINGS

Features of the present disclosure are illustrated by way of examples shown in the following figures. In the following figures, like numerals indicate like elements, in which:

FIGS. 14A and 14B show the extraction and display of validated data fields from a loan package in accordance with an example.

FIGS. 15A and 15B illustrate the validation of data fields in accordance with examples described herein.

DETAILED DESCRIPTION

Figure 1:
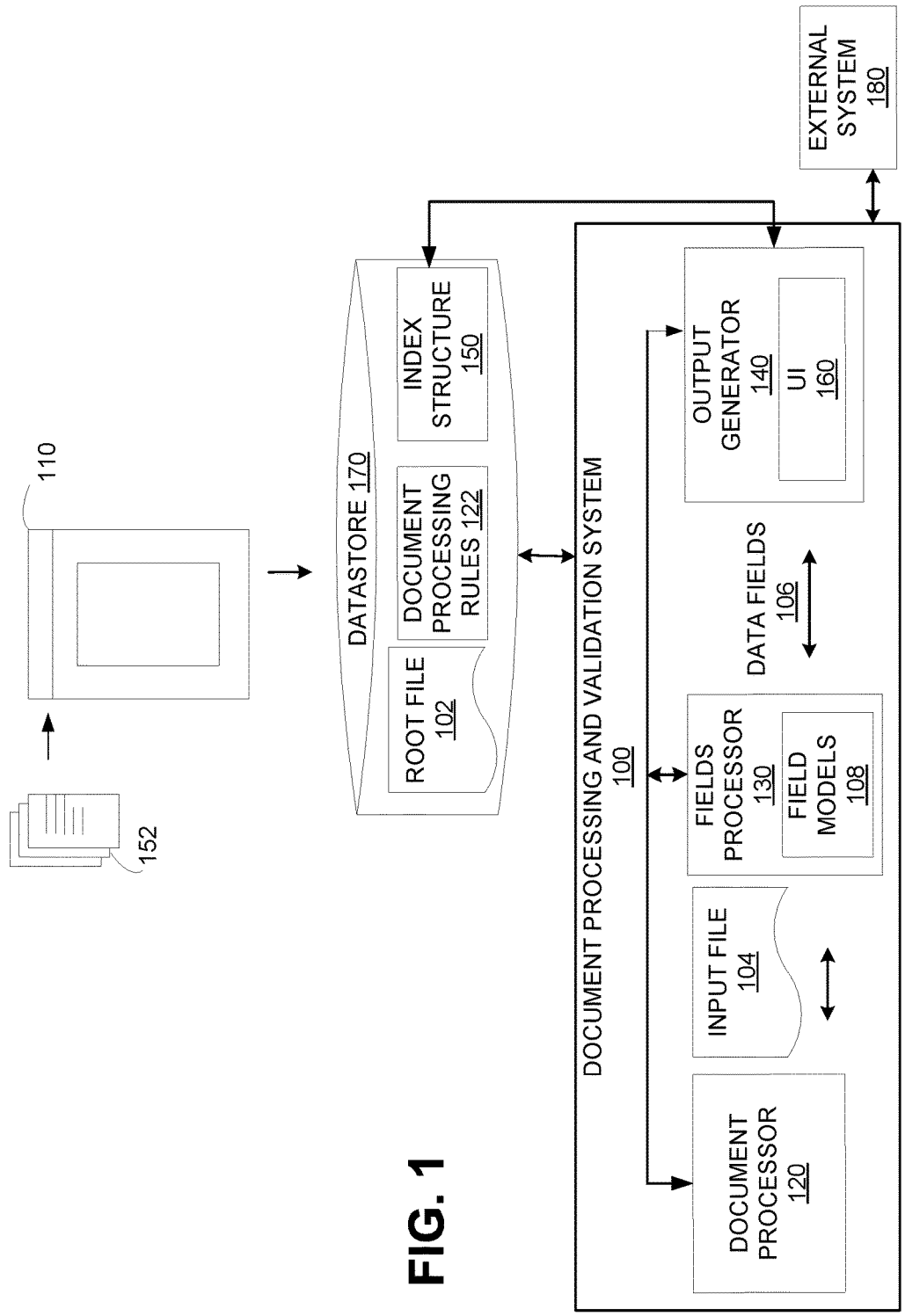
FIG. 1 is a block diagram that shows a document processing and validation system in accordance with an example.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, a document processing and validation system is described which analyzes a collection of documents digitized in a non-editable format to extract and validate data fields therein. The digitized document collection is also referred to herein as a package. The package therefore contains a plurality of digitized documents that are generated for a particular purpose such as an application for a loan, a college admission application, a business or personal bank account, and the like. A digitized document can include without limitation, a digital copy of a prescribed form with some data to be provided manually, a letter, a certificate, a printout or other single-page or multi-page paper document which may have been manually processed to contain typed or hand-written input. Image processing apparatus such as a scanner can be employed to generate the digitized documents from the corresponding paper documents.

The digitized document collection may be received by the document processing and validation system in a file which is referred to herein as a root file. Based on a purpose associated with the package, the root file can be initially classified into a plurality of document types. For example, a root file containing a collection of digitized documents generated for securing a loan can be classified under a document type as a loan application. Similarly document types such as but not limited to a college admission, a health record, a piece of literature, an application for a bank account application and the like can be defined within the document validation and processing system.

Based on the document type classification of the root file, a set of rules for processing the digitized documents can be applied. Each of the document types mentioned above may need to be processed differently as the documents contained within the root file are different. The document processing rules may include not only rules for processing individual digitized documents but also the rules for processing individual data fields. The document processing rules may include document identification material such as but not limited to logos or images, titles and page layout information including the number of pages that can be expected in the digitized documents. Similarly, information regarding the data fields in each of the digitized documents such as but not limited to the data types, value ranges, positional information and the like can also be included in the document processing rules.

The document identification information is employed to identify individual digitized documents within the root file. It can be appreciated that the root file may include multiple versions of similar material such as the same form which may be filled differently wherein the versions differ in one or more data fields. The root file may also include identical duplicate copies of the same material. The document processing rules can also be employed to select one or more of the versions and to eliminate the duplicate copies for further processing. For example, the document processing rules may specify that a digitized document that is notarized, signed or otherwise bears a mark or image of approval should be used for data extraction. Hence, a version of the digitized document that bears such as mark may be selected over other digitized documents that are eliminated from further processing. The selection of digitized documents can be achieved via classifiers that are trained on image analysis and recognition techniques in order to differentiate between the various digitized documents, identify multiple versions and duplicates. The selected digitized documents which are referred to herein as significant documents are packaged together to form an input file. The root file is thus processed to be slimmed down to an input file which may include a collection of digitized documents as prescribed by the document processing rules.

The input file is processed page-by-page to identify and extract information regarding the various data fields. Again, the document processing rules include information regarding the data fields such as a list of data fields that are included in the significant documents, the position information including the identity of the significant documents and portions therein where the data fields may be expected, information regarding the values of the data fields such as the data types, patterns, value ranges, of the data fields and the like. Machine learning (ML) techniques may be employed for identifying the data fields among the pages of the input file and extracting the data field values. The information regarding the data fields including their positions and values is extracted and stored in an index structure. In addition, the data fields are tested to verify if they satisfy one or more validation conditions. Based on the statistics from the validation tests, the data fields may each be assigned a confidence score so that a data field that does not meet all the validation conditions can be marked for further manual review.

A user interface associated with the document processing and validation system can be coupled to the index structure. The user interface can be configured to retrieve and display the information from the index structure thereby facilitating manual review of the extracted data. The user interface is partitioned into two portions wherein the input file is displayed in an image portion while data extracted from the document is displayed in an extracted data portion. Selection of a data field in the extracted data portion causes the corresponding part of the input file which is the source of the extracted data value to be displayed in the image portion. If the user interface fails to display the source of the extracted data in the image portion, the user may train the field classifiers explicitly during usage by manually searching the data field within the input file via scrolling in the image portion and clicking on it. The user input providing the position of the field is received and the field classifiers of the data field are trained on the user input so that during subsequent usage, the data processing and extraction system can locate the data field within the input file.

The document processing and validation system described herein provides a technical improvement over existing document processing systems and methods. While digitized forms, letters and certificates conducive for storage to digital hardware are used, many tasks such as applying for loans, opening bank accounts, applying for college admissions and the like may require submissions of paper copies of a large collection of documents which may include certain prescribed forms, recommendation letters, certificates and the like. When large document collections or packages having documents with dissimilar layouts are received, computing apparatuses are merely used to store the documents in digitized format such as scanned images. However, such scanning and storage systems do not provide for automatic data extraction and data field validations as the scanning and storage systems are not configured to analyze the various layouts to extract data fields within. While optical character recognition (OCR) techniques are used for character identification, they fail to produce accurate output when many documents with dissimilar layouts and complex data organizing structures including tables, lists and the like are used. Document processing tasks are therefore executed manually by data entry operators as the output from scanning the paper is obtained in non-editable format such as image files.

The document processing and validation system disclosed herein is pre-programmed to initially classify the documents based on their intended tasks and proceeds to apply document processing rules based on the classification. As a result, different document packages that are put together for different purposes are processed using different document processing rules. Hence, the examination of documents, comparison of data values and conclusions regarding whether or not the documents and/or the data values meet the validation rules are more accurately executed by the document processing and validation system thereby reducing the need for human intervention in these tasks.

FIG. 1 is a block diagram that shows a document processing and validation system 100 in accordance with an example. The document processing and validation system 100 receives or accesses a root file 102 comprising non-editable, digitized documents which are processed in accordance with document processing rules based on a document type of the root file in order to validate and extract fields in a format that enables searching of the non-editable digitized documents for specific values via a UI associated with the document processing and validation system 100. In an example, the root file 102 may include forms, certificates, documents and other papers 152 that are digitized via a scanner 110 in order to be fed into the document processing and validation system 100. The root file 102 may include a collection of digitized documents such as but not limited to appraisals, sale deeds, approvals, notes, payment letters, transaction summaries, certificates and the like that are scanned and provided as input to the document processing and validation system 100. A typical root file may range over 400-800 pages and include 70-80 different types of documents. Each document within the root file 102 may include one or more pages. Moreover, the root file 102 may also include multiple versions of the documents. For example, the root file 102 may include an unexecuted version of a document and an executed version of the same document.

The document processing and validation system 100 is communicatively coupled to a data store 170 which may temporarily or permanently store data accessed, modified or generated by the various processes as described herein. The document processing and validation system 100 includes a document processor 120 that classifies the root file 102 in one of a plurality of document types and based on a selected document type, processes the root file 102 via a set of document processing rules 122 to slim down the root file 102 to form an input file 104 which may range from 300-700 pages. The input file 104 is therefore, also a non-editable, digitized collection of documents. In an example, the input file 104 may be similar in format to the image obtained from the scanner 110 albeit with fewer pages as compared to the root file 102. The document processing rules 122 can specify the documents and the versions of the documents that are to be included in the input file 104. In an example, the input file 104 may therefore include a single version from a plurality of document versions that may be included in the root file 102. In some examples, not all the documents from the root file 102 are included in the input file 104. For example, a particular document from the root file 102 whose fields are not needed may be completely excluded from the input file 104.

A fields processor 130 parses and analyzes the input file 104 to obtain values of a plurality of data fields 106. In addition, the locations of each of the plurality of data fields 106 within the input file 104 is also obtained by the fields processor 130. In an example, the location of a data field may be defined not only by the page number on which the data field is included within the input file 104 but may also include the position coordinates within the page where the data field is located. In an example, the position coordinates may define the position of the data field with respect to the edges of the page. In addition, the fields processor 130 may include a plurality of field models 108 respectively corresponding to each of plurality of data fields 106. The plurality of field models 108 in conjunction with the document processing rules 122 are not only used for identifying the data fields 106 from the input file 104 but also for validating the data fields 106. The document processing rules 122 may include rules for one or more of data types, data patterns or definite values, date ranges that are expected for the data fields. In an example, the document processing rules 122 may also include calculations involving multiple data fields that enable validating one or more of the multiple data fields. The number of data fields extracted and validated by the fields processor 130 from the input file 104 may depend on the requirements as set forth in the document processing rules 122. By the way of illustration and not limitation, more than 300 data fields with their values and locations may be extracted from the input file 104. The fields processor 130 is additionally capable of signaling to the user, the validity of each of the plurality of data fields 106. Each of the plurality of data fields 106 may jointly or separately need to satisfy single or multiple validity tests or conditions. Based on the conditions satisfied by a data field, the fields processor 130 can indicate to the user a confidence score associated with the data field thereby flagging the data field with a lower confidence score for further manual review in some examples.

An output generator 140 included with the document processing and validation system 100 is configured to generate an index structure 150 which stores therewithin the value, confidence score associated with the value and the location of each of the plurality of data fields within the input file 104. The index structure 150 may be stored for example, in the data store 170 associated with the document processing and validation system 100. In addition, the output generator 140 also includes a user interface (UI) 160 with controls which are populated with data from the index structure 150. When a control is populated with the value of a data field, clicking on the control enables navigation to a source position within the input file 104 from where the value of the data field has been extracted.

The UI 160 and the index structure 150 are enabled for two way updates such that the index structure 150 can altered from the UI 160 when required. If the output generator 140 fails to navigate to the location of a data field within the input file 104, the user may manually navigate to the source position of the data field within the input file 104 and point out the location of the data field to the output generator 140, for example, by clicking on the data field in the input file 104. The next time the user looks clicks on or otherwise selects the data field, the index structure 150 now includes the data field location information so that the correct position within the input file 104 may be displayed by the UI 160. Moreover, the plurality of data fields 106 may be color coded based on confidence scores so that data fields with low confidence scores can be flagged for manual verification. The validated data from the index structure 150 can also be uploaded to an external system 180 for further processing. The external system may include functionalities such as, generating one or more data files from the validated data.

Figure 2:
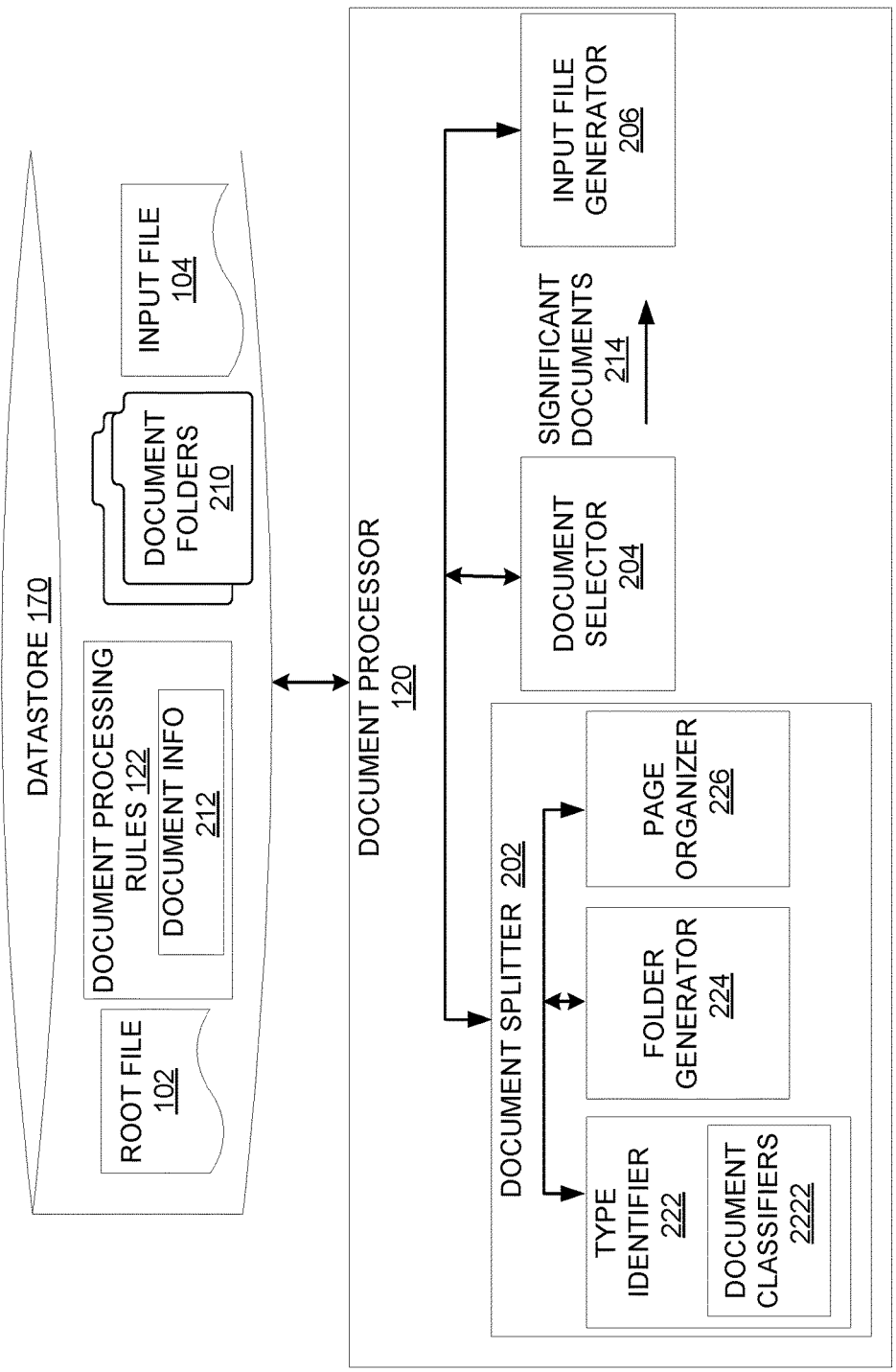
FIG. 2 is a block diagram showing the details of a document processor in accordance with an example.

FIG. 2 is a block diagram showing the details of the document processor 120 in accordance with an example. The document processor 120 includes a document splitter 202 that accesses the root file 102 from the scanner 110 and splits it into separate digitized documents and their corresponding versions for further selection of particular documents and specific versions. When the root file 102 is initially received, the document splitter 202 initially classifies the root file 102 into one of a plurality of document types based at least on the document information 212 which may be part of the document processing rules 122. Various document types such as but not limited to loan documents, approvals, sale deeds, income certificates, marriage certificates, educational certificates and the like can be included in the root file 102. Based on various criteria such as but not limited to, the various documents included, versions of the documents, arrangement of the documents, and the like, the root file 102 may be classified as one of the document types. By the way of illustration and not limitation, the root file 102 may be classified as one of a housing loan application, an educational loan, business loan or approval package, or other types of document such as a college admission package, an application for a bank account, tax documents and the like.

The document information 212 which is used in classifying the root file 102 can include, an identity of and the number of pages of the digitized documents expected with the document package, logos, images, form layouts and the like which can aid in identifying various digitized documents that characterize the root file 102 as one of the document types and the like. The type identifier 222 may include document classifiers 2222 such as support vector machines (SVMs) which are trained to identify the document type based on the document information 212. The document classifiers 2222 may not only be trained to identify the document type of the root file 102 but are also trained to identify the specific documents that make up the root file 102. In one example, the document classifiers 2222 may also include image classifiers that implement optical character recognition, pattern and gradient matching and other similar techniques to identify the specific documents included in the root file 102. For example, the type identifier 222 may not only identify the root file 102 as a housing loan application but can also be configured to automatically identify the various documents such as a loan application form, income certificate, property appraisal form and multiple versions of such documents that make up the root file 102. It can be further appreciated that a document may contain multiple pages. For example, a digitized document such as an application form can contain multiple pages and based on the document information 212, the type identifier 222 can be configured to identify the multiple pages of the digitized document. The type identifier 222 can be further configured to determine if multiple versions of a document or duplicate copies of the same document were included in the root file 102. A document can have multiple versions wherein there are minor differences between one version and another version. The differences may exist for example, in the user entered information rather than the form layout. If the form layout and the user entered information are identical between two documents within the root file 102, then the documents can be determined to be duplicate copies one of which may be discarded in further processing unless identified as necessary by the document processing rules 122.

Upon identifying a document type of the root file 102 and the details of the various documents therewithin by the type identifier 222, the folder generator 224 employs to document processing rules 122 to determine the number of documents that are to be included within the input file 104 to be generated. The folder generator 224 generates document folders 210 equal to a number of unique documents to that multiple versions and duplicates of a particular document are placed within the same folder. In an example, the folder generator 224 may create one folder for each digitized document is placed within its respective folder. Again, using the data from the document classifiers 2222 which classify the documents within the root file 102, the page organizer 226 can identify the various constituent documents within the root file 102 and store each of the documents within the document folders 210 as determined by the document processing rules 122.

The document processor 120 includes a document selector 204 which accesses the document folders 210 and selects particular versions of specific documents which will be referred to herein as significant documents for inclusion into the input file 104. The document selector 204 may select the document versions based again on the document processing rules 122. For example, the document processing rules 122 may require a document version that is stamped or otherwise marked for approval for inclusion into the input file 104. The document classifiers 2222 may use the document processing rules 122 which identify an image or a pattern marking the approved version of the document. The document selector 204 employs the information from the document classifiers 2222 identifying the approved version of the document for inclusion into the input file 104. It can further be appreciated that the input file 104 may thus contain significant documents 214 which are a subset of the digitized documents from the root file 102 selected based at least on the document processing rules 122 so that only unique copies of documents digitized by the scanner 110 and specified by the document processing rules 122 are included in the input file 104.

The information regarding the significant documents 214 is received by the input file generator 206. Each of the significant documents 214 can be accessed by the input file generator 206 from the respective document folders 210. A significant document that is selected for inclusion into the input file 104 is thus a particular version of a specific document. The input file generator 206 may further access the document processing rules 122 to arrange the significant documents in a particular order to form the input file 104. The input file 104 is further processed for identification and extraction of fields therefrom in downstream processes as detailed infra.

Figure 3:
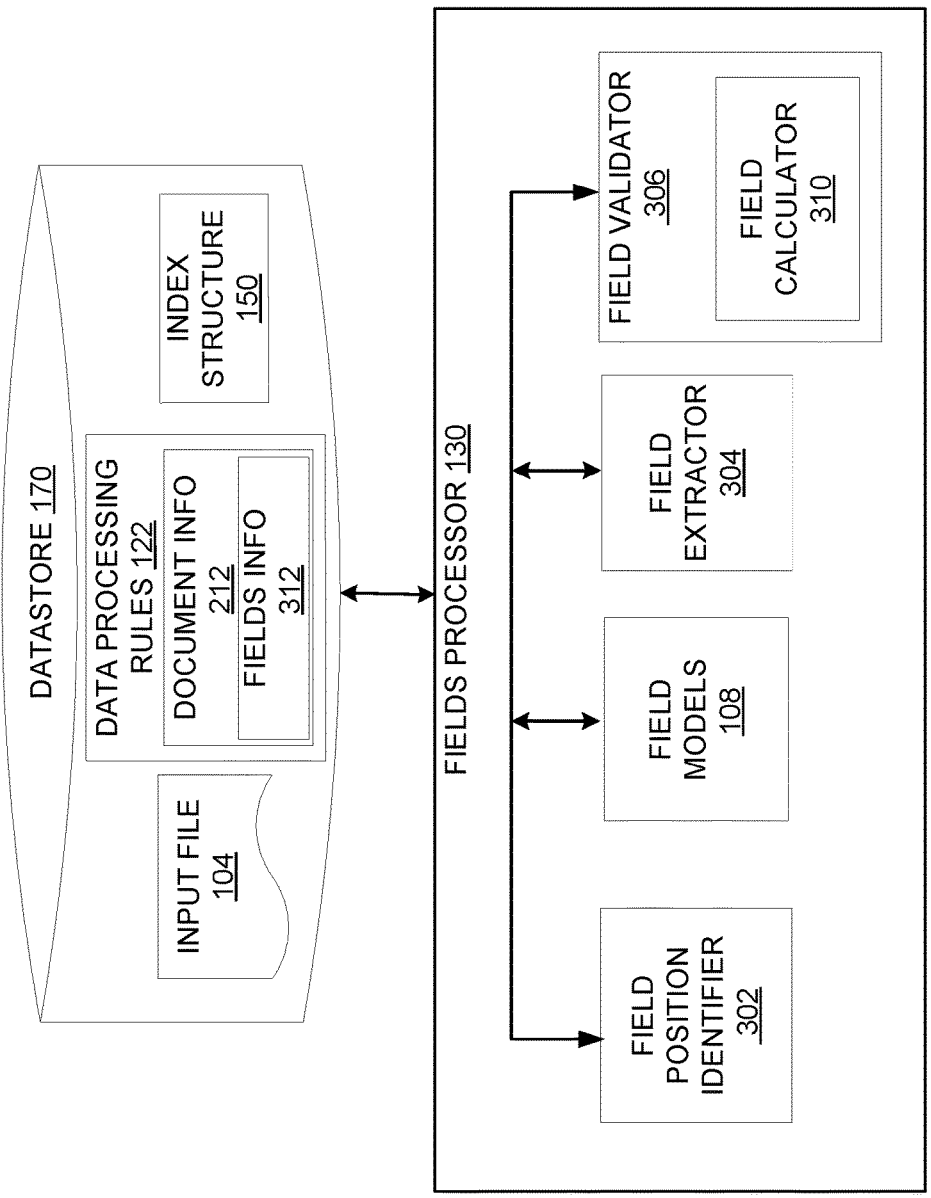
FIG. 3 is a block diagram illustrating the details of a fields processor in accordance with an example.

FIG. 3 is a block diagram illustrating the details of the fields processor 130 in accordance with an example. The fields processor 130 parses and analyzes the input file 104 to identify a plurality of data fields 106 and their positions within the input file 104, extract the values of the data fields from the input file 104 which will enable building the index structure 150. A field position identifier 302 analyzes the input file 104 based on the document information 212 which can further include fields info 312. For each of the documents in the documents info 212, the fields info 312 can include, information regarding the data fields in that document such as but not limited to, a list of data fields that are expected within the document, data types, patterns, value ranges and information regarding a layout of the document which can include a likely position of the field within the non-editable document. It can be appreciated here that the input file 104 maintains similar format as the root file 102 in that the input file 104 is also a non-editable file including unstructured data. Hence, machine learning (ML) elements such as classifiers that make up the field models 108 which, based on the fields info 312, identify the fields and their values within a given document are also included in the fields processor 130. The field models 108 employ machine learning (ML) techniques such as pattern identification or other image recognition techniques mentioned herein to identify the data fields 106 within the input file 104. By the way of illustration and not limitation, the field position identifier 302 can output the position of each of the plurality of data fields in terms of page number and coordinates or other values that enable unambiguous identification of the data field positions within a given page of the input file 104. In an example, the field models 108 may be pre-trained on training data sets for identifying positions of the data fields within the input file 104. In an example, the field models 108 may be trained by users in accordance with techniques detailed herein during the usage of the document processing and validation system 100 if the field position identifier 302 fails to identify the position of a data field that a user is looking for.

A subset of the field models 108 can adopt the ML learning techniques outlined above to further identify values of the data fields. Each data field may be identified using a respective one of the field models 108. Various data fields within the input file 104 may include those which receive without limitation, values of text data types, numeric data types, alpha-numeric data types, Boolean data types, symbols and the like. Based on the document information 212 and the fields info 312, the subset of the field models 108 can be trained to look for specific patterns signifying values of particular data fields. Moreover, as the information regarding the position of the data fields within the input file 104 is available from the field position identifier 302, the fields extractor 304 can be configured to parse, extract or otherwise obtain values of specific data fields at the identified positions within the input file 104.

The data fields for which the positions within the input file 104 are identified and values extracted therefrom are subsequently validated by the field validator 306. The fields may be validated based on further document processing rules 122 such as but not limited to, expected data types, pattern matching, value ranges and the like. The field validator 306 can also be configured to validate a combination of multiple data fields. Accordingly, a field calculator 310 may be included within the field validator 306 for the validation of one or more data fields. For example, a combination of values from data fields like the interest rate, loan period and total amount may be used to validate one of more of these data fields. The information regarding the data fields 106, the values and the positions of the data fields 106 within the input file 104 is transmitted to the output generator 140 which generates the index structure 150 to store the information from the fields processor 130. The information thus stored in the index structure 150 is displayed to the users via the user interface 160, for manual review and/or validation. By the way of illustration and not limitation, the fields processor 130 can process an input file having more than 35 documents to extract a set of 267~325 unique data fields approximately to build the index structure 150.

Figure 4:
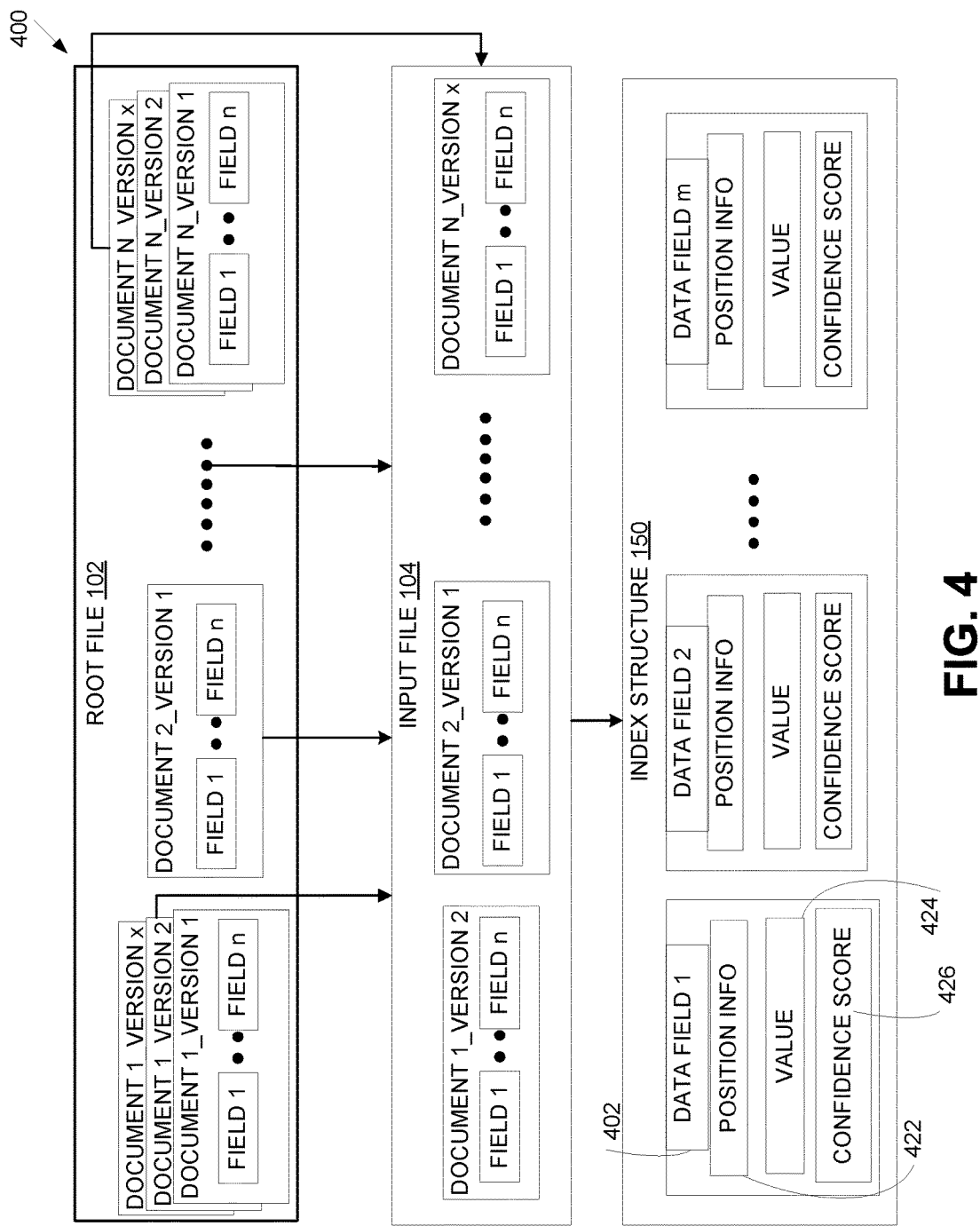
FIG. 4 is a schematic diagram that shows the development of an index structure in accordance with examples disclosed herein.

FIG. 4 is a schematic diagram 400 that shows the development of the index structure from the root file 102 in accordance with examples disclosed herein. As mentioned above, the root file 102 is obtained by digitizing the paper documents or papers152. In an example, the scanner 110 may be used to create the digitized documents document 1, . . . , document n by scanning the papers 152. The scanner 110 can be configured to transmit the scanned image of the papers 152 or the root file 102 to the document processing and validation system 100. The root file 102 therefore, includes unique documents, document 1, document 2, . . . document N. Some of the documents such as document 1, document N may have multiple versions as indicated by version 1, version 2 . . . version x. Each of the digitized documents may include one or more of a plurality of data fields such as data field1 to data field n wherein N, n and x are natural numbers taking values 1, 2, . . . The different versions of a given document may vary in one or more of the data fields. For example, one or more data fields in one version may not have been filled whereas the data field values are supplied in another version. In some cases such as the document 2, only one version is included in the root file 102. In some examples, the root file 102 may further include duplicates wherein two digitized documents are identical to each other.

The input file 104 is generated by the document processor 120 via slimming down the root file 102 to exclude duplicates, multiple versions (unless otherwise specified by the document processing rules 122) and the like. The document processing rules 122 can identify certain significant digitized documents that are required for data extraction and validation purposes. In some cases, certain digitized documents may also be excluded during the slimming down of the root file 102. The input file 104 is therefore a non-editable digitized document such as a scanned image which includes a subset of the digitized documents from the root file 102. In the illustrated example, significant documents including version 2 of document 1, version 1 of document 2 . . . version x of document N are selected for inclusion in to the input file 104.

The input file 104 is further processed by the fields processor 130 to identify and validate the various data fields 106 from the digitized documents of the input file 104. For each validated data field, such as data field 402, the fields processor 130 further obtains the position information 422 of the field within the input file 104, the value 424 of the data field 1 as given in the input file 104 and a confidence score 426 for the data field 402 as calculated from the input file 104. The fields processor 130 extracts and stores within the index structure 150, the position information 422 of the data field 402 within the input file 104 in accordance with the examples discussed above. The confidence score of the data field 402 may be calculated based on the validation tests or conditions that value 424 of the data field 402 satisfies. Validation conditions for the data field values may include but are not limited to compliance with data types, patterns, value or date ranges either individually or in combination with other data fields and the like. If the data field value 424 satisfies all the validation conditions, it can have a high confidence score whereas a data field that fails one or more validation conditions may have a lower confidence score. Moreover, if the data field 402 is to satisfy multiple validation conditions, the validation conditions may be weighted so that satisfaction or failure of one of the validation condition may have a higher contribution confidence score as compared to another validation condition. Hence, data fields within the index structure 150 having lower confidence scores are flagged for manual review.

Figure 5:
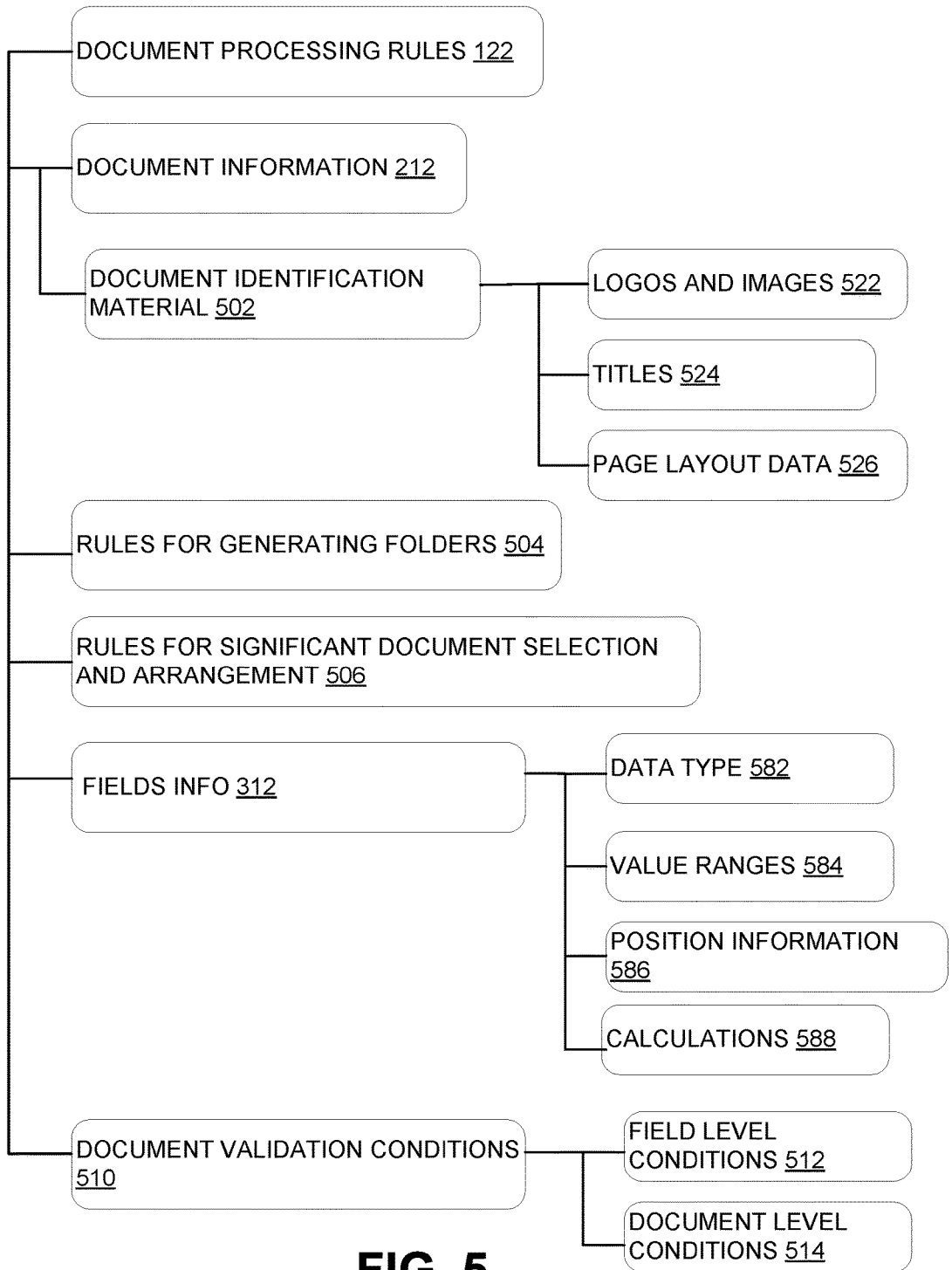
FIG. 5 is a block diagram that shows some examples of document processing rules discussed herein.

FIG. 5 is a block diagram that shows some examples of the document processing rules 122 discussed herein that are implemented via various components such as the field models 108, document classifiers 2222, and the like. The document processing rules 122 include document information 212 such as document identification material 502 which are used to not only classify a root file under a document type but are also rules for page-by-page identification of the digitized documents within the root file 102. The document identification material 502 can include but is not limited to, logos and images 522 that may be printed or pasted on the papers 152, the titles of the pages 524 which may include form numbers, names of organizations and the like and page layout data 526. Page layout data 526 can include without limitation, the number of fields in a page, the order of arrangement of the fields, the positions of the fields, any tables, lists and other data organizing structures that are included in the page and the like. The rules for generating folders 504 during slimming down of the root file 102 and the rules for selection and arrangement of significant documents 506 are also included in the document processing rules 122. The document processing rules 122 may further include information regarding the fields 312 that are within the digitized documents. The fields information 312 can include but is not limited to the identification information of the digitized documents including the data fields, data types 582 of the data fields, value ranges 584 of the data fields, field position information 586 which describes where the data fields are positioned within the pages of the digitized documents and the various calculations 588 that may be required to validate certain fields. The field position information 586 may be a subset of the page layout data 526 in an example. The document processing rules 122 can also include validation conditions 510 which may pertain to field level conditions 512 and document level conditions 514. The field level conditions 512 are applied to individual fields singly or to multiple fields while the document level conditions 514 associated with the document as a whole. Field level conditions 512 can include pattern matching, particular value ranges, calculations involving multiple fields and the like. Document level conditions 514 can also involve, for example, validating multiple fields in a document, whether a document is signed and the like. Document level conditions 514 may also involve verifying values of certain fields from multiple documents and flagging the documents or fields for review if any discrepancies are detected. It can be appreciated that listing of the document processing rules 122 discussed herein is not an exhaustive list and that more document processing rules can be included for processing of various documents in accordance with examples detailed herein.

Figure 6:
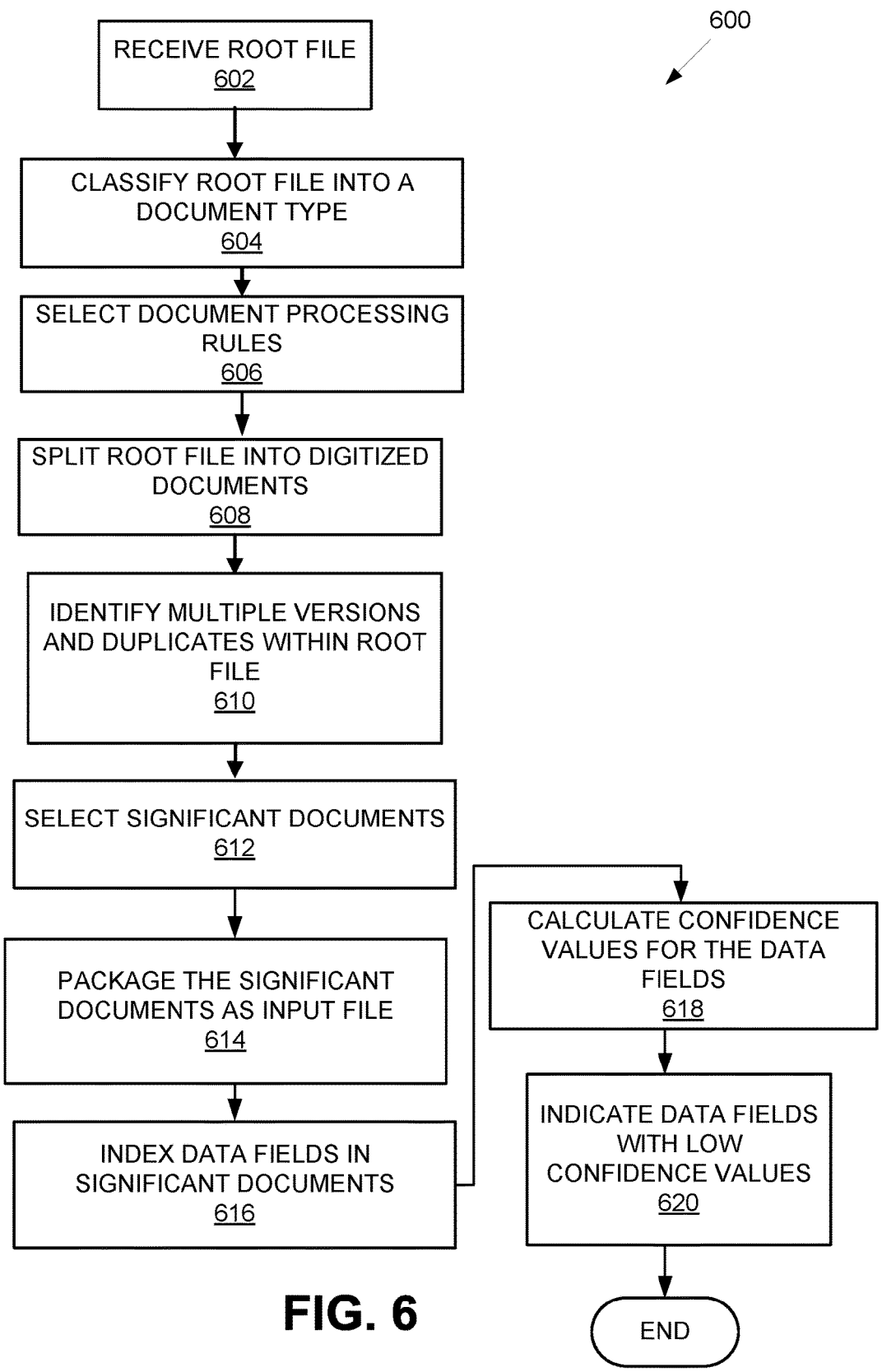
FIG. 6 is a flowchart that details a method of automatically obtaining and validating data fields from a plurality of digitized documents in accordance with an example.

FIG. 6 is a flowchart 600 that details a method of automatically obtaining and validating data fields 106 from a plurality of digitized documents in accordance with an example. The method begins at 602 wherein a root file 102 comprising a plurality of digitized documents is received. The root file 102 may be received via an automatically generated communication from hardware devices such as the scanner 110 which is used to digitize papers 152 some of which may be manually completed for example, via typing or with handwritten input. The root file 102 is classified into one of a plurality of document types at 604 based on the document processing rules 122. Based on the document type classification, the rules for processing the root file 102 are selected at 606. Different document types may have different processing rules associated therewith. For example, the forms, certificates, letters, images and the like in a loan application are different as compared to a health record. Accordingly, the document type classification enables the document processing and validation system 100 to determine the processing rules for the root file 102.

At 608, the root file is split into the constituent digitized documents in accordance with the classification of the root file 102. At the time of splitting the root file 102, the digitized documents expected within the root file 102 are known since the information is obtained from the document information 212 at 604 for the classification. Accordingly different versions of the same document which have minor differences or duplicates of the same document which are identical are identified for within the root file 102 at 610. At 612, based on the document processing rules 122, a subset of the digitized documents are selected as significant documents for inclusion into the input file 104. The document processing rules 122 may require certain mandatory data fields to be filled or certain documents to be signed or notarized or stamped for approval and the like. At 614, the digitized documents are put together or packaged to form an input file 104 as a result of which the root file 102 is slimmed down to the input file 104 which has similar format as the root file 102 but with duplicates and multiple document versions eliminated. An index structure 150 storing information regarding the data fields in the input file 104 is created at 616. The index structure 150 may store information such as but not limited to, the positions of the data fields within the input file 104, the values of the data fields and the like. As the data fields are checked for validation, the confidence scores are calculated for the data fields at 618. The data fields with low confidence scores are indicated to the users for manual review at 620. At 622, the validated data may be uploaded into external applications for further uses. The further uses may include, for example, generating a data file including the validated data from the applications.

Figure 7:
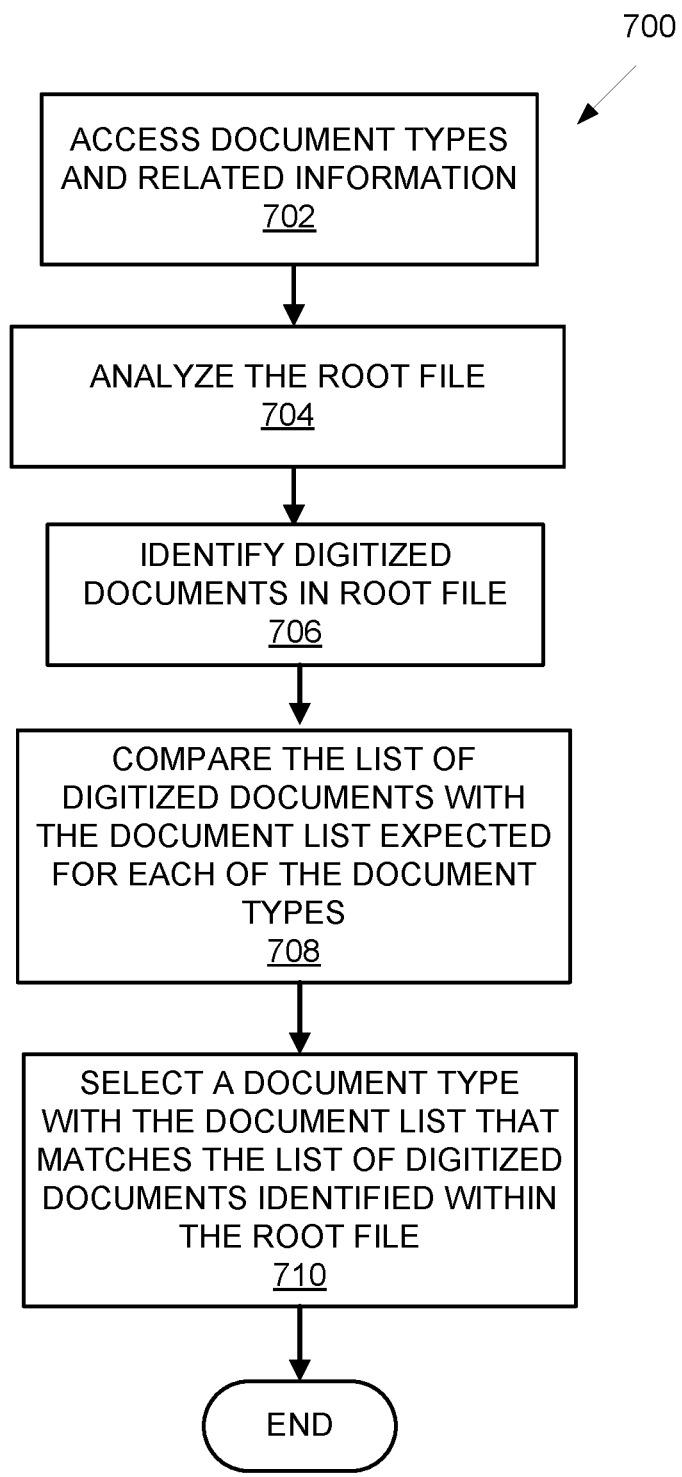
FIG. 7 is a flowchart that details a method of automatically classifying a root file into one of the plurality of document types using ML techniques in accordance with an example.

FIG. 7 is a flowchart 700 that details a method of automatically classifying the root file 102 into one of the plurality of document types using ML techniques in accordance with an example. The plurality of document types can include but are not limited to loan package including standardized forms provided by a business concern and certificates, documents for college admissions such as admission forms and certificates, business related papers such as those for opening a bank account or a business, submissions to tax authorities including tax forms, receipts, health records or other business or private document types as defined in the document processing and validation system 100. Each of the document types may have a list of documents and related information associated therewith. For example, for the loan package, the list may include without limitation, all the documents to be included in the package and related information can include without limitation, format or layout of the forms, a number of the distinct or unique forms letter, certificates and the like in the loan package, the order in which the forms, certificates, letters etc. are to be arranged in the loan package, and the like. Accordingly, the plurality of document types and related information is accessed at 702. At 704, the root file 102 is analyzed using, for example, image analysis techniques such as but not limited to, pattern matching, color/gradient variations and the like as detailed herein. Based on the analysis at 704, the digitized documents within the root file 102 are identified at 706. The combination of digitized documents identified at 706 is compared with the list of expected documents for each of the document types at 708. At 710, the root file is classified into a document type for which the list of documents matches the distinct/unique digitized documents included in the root file 102. Accordingly, duplicates, multiple versions may be discarded from consideration while classifying the root file 102.

Figure 8:
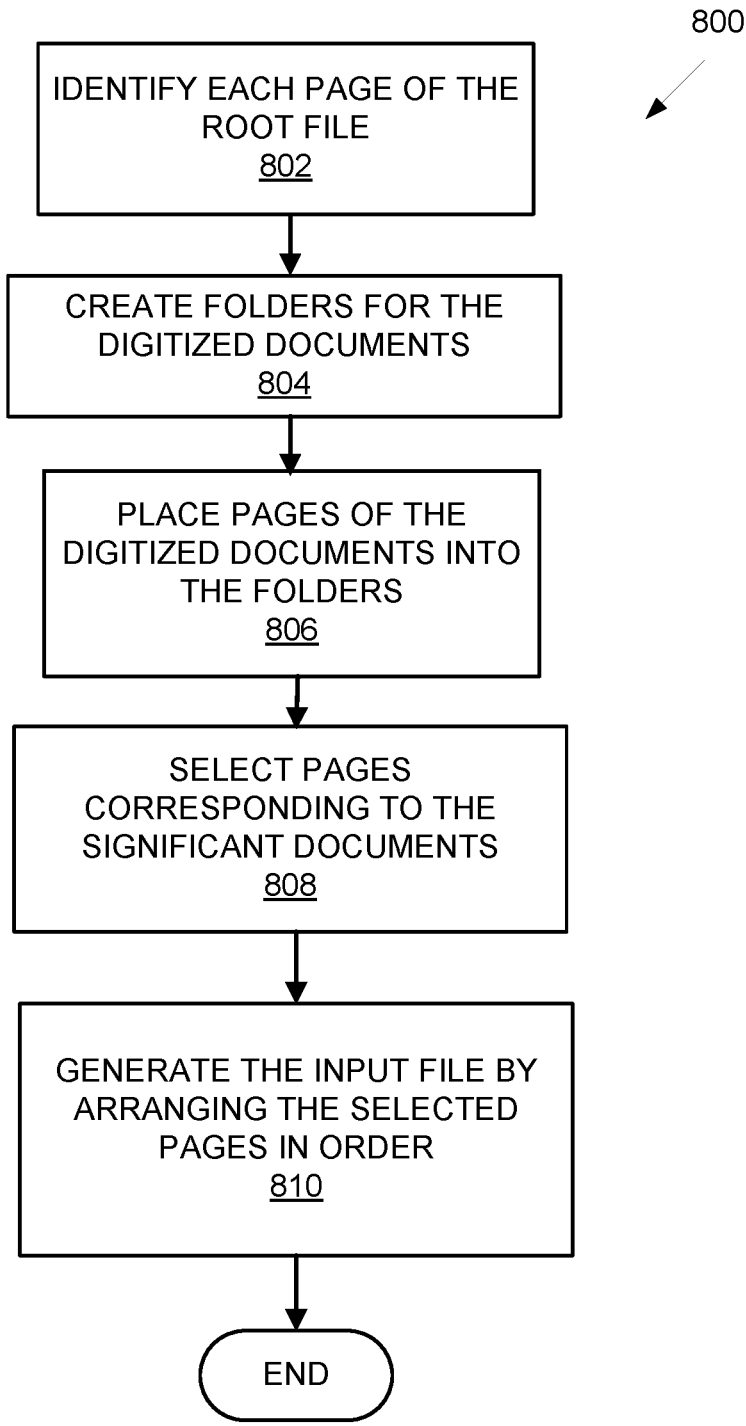
FIG. 8 is a flowchart that details a method of obtaining significant documents from the root file in accordance with an example.

FIG. 8 is a flowchart 800 that details a method of obtaining significant documents from the root file 102 in accordance with an example. The method begins at 802 wherein each page in the root file 102 is identified using the document processing rules 122. The document processing rules 122 may include aids such as logos, titles, form/letter layouts, data fields and their expected values, range of the data field values, the data types of the data field values and the like. The document classifiers 2222 can employ the aids from the business rules to identify each page within the root file 102. Accordingly, forms, letters, certificates or documents with multiple pages which may include the second side of a page having matter on two sides are identified at 802. The pages identified at 802 may belong to unique digitized documents which do not have other versions or copies within the root file 102 in an example. In another example, a subset of the digitized documents in the root file 102 may be different versions of the same document or maybe identical copies of the same document.

At 804 various folders are created for placement of the unique documents within the root file 102. In this case, the different versions or identical copies of a document are placed within the same folder. In another example, the total number of folders created can equal the total number of digitized documents within the root file 102. Based on the number of folders created, each paper of the digitized documents as identified at 802 can be arranged into the corresponding folders at 806. At 808, significant documents which are made up of the pages of digitized documents corresponding to the versions of documents as specified by the document processing rules 122 are selected for inclusion into the input file 104. Generally, while one version of a document may be included in the input file 104, digitized documents corresponding to multiple versions of a document can also be included if it is so specified in the document processing rules 122. The selected pages that make up the significant documents are arranged in an order specified by the rules for significant document selection and arrangement 506 to generate the input file at 810.

Figure 9:
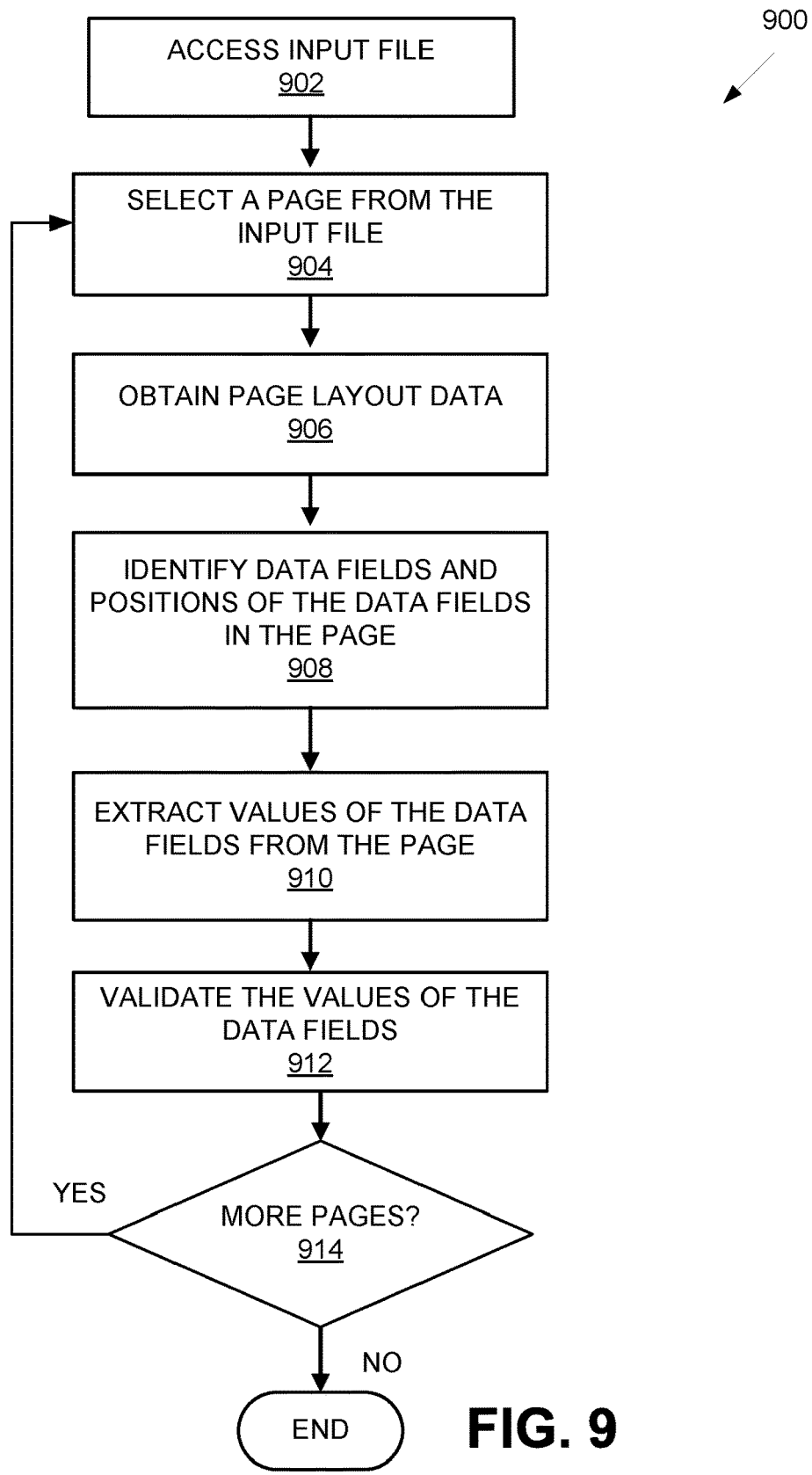
FIG. 9 is a flowchart that details a process of extracting the data fields from an input file in accordance with an example.

FIG. 9 is a flowchart 900 that details a process of extracting the data fields from the input file 104 in accordance with an example. The method begins at 902 wherein the input file 104 is accessed. A page from the input file 104 is selected for processing at 904 and the page layout data 526 is obtained at 906. The data fields and the positions of the data fields within the page are identified at 908 using the page layout data 526. The values of the data fields are extracted from the page at 910. Field models 108 which are trained on the patterns, data values and their ranges and the like are employed for extracting the data field values at 910. The extracted data field values are validated at 912. It is determined at 914 if further pages remain to be processed for data field extraction. If yes, the method returns to 904 for selecting the next page and if no more pages remain to be processed, the method terminates on the end block. It can be appreciated that the processing of the pages from the input file 104 is described serially for illustration purposes and that the pages of the input file 104 can be processed simultaneously in parallel in accordance with some examples.

Figure 10:
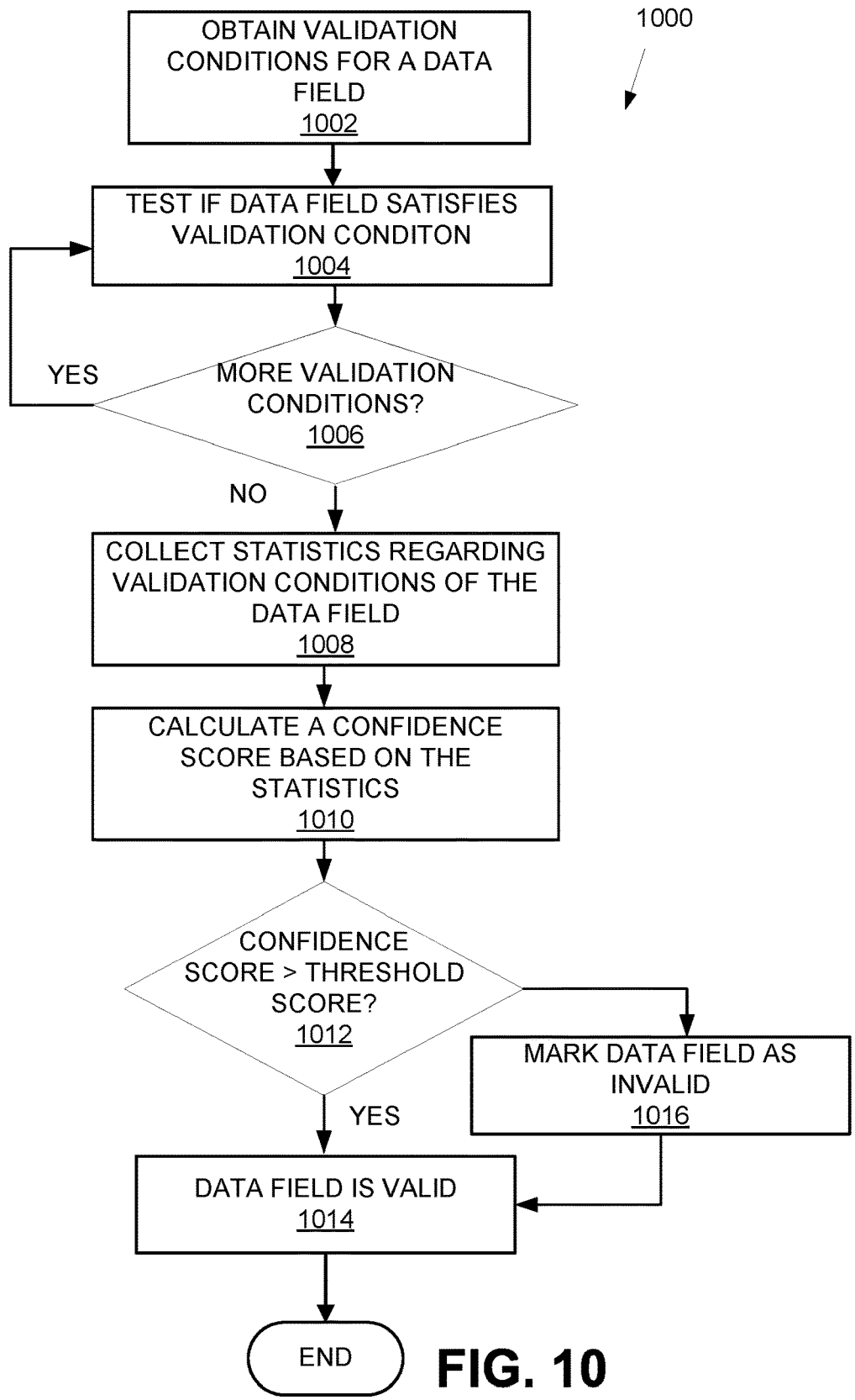
FIG. 10 is a flowchart that details a method of validating the data fields and calculating confidence scores in accordance with an example.

FIG. 10 is a flowchart 1000 that details a method of validating the data fields and calculating the confidence score in accordance with an example. The method begins at 1002 wherein the validation conditions or rules are obtained for a data field in a page of the input file 104. The data fields in a page may have one or more validation conditions which may further involve other data fields. For example, a single data field may require to satisfy multiple conditions in order to be validated. Some data fields are required to simultaneously satisfy some of the validation conditions. For example, a validation condition may be defined such that a rate of interest, time duration and an original amount together in a calculation for a total amount should equal the total amount given in other pages of a loan application package. At 1004, the data field is tested for a validation condition. At 1006 it is determined if further validation conditions remain for testing the data field. If yes, the method returns to 1004 for test the next validation condition. If no further validation conditions remain for testing, the statistics regarding the validation conditions satisfied by the data field are collected 1008. The statistics may involve the number of validation conditions defined for the data field, the number of validation conditions satisfied for the data field, the weightage if any for each of the validation conditions, the average/median or other measure of confidence of the data field. The confidence score therefore, measures the extent of compliance of the data field with the various validation conditions. At 1010, a confidence score is calculated for the data field based on the statistics. It is determined at 1012 if the confidence score is greater than a certain predetermined threshold score. If the confidence score is greater than the threshold score, the data field is determined to be valid at 1014 and the method terminates on the end block. If it is determined at 1012 that the confidence score is less than the predetermined threshold score, the data field may be marked as invalid at 1016, for example, via color coding the data field on the UI 160 thereby flagging it for further manual review and the method terminates on the end block.

Figure 11:
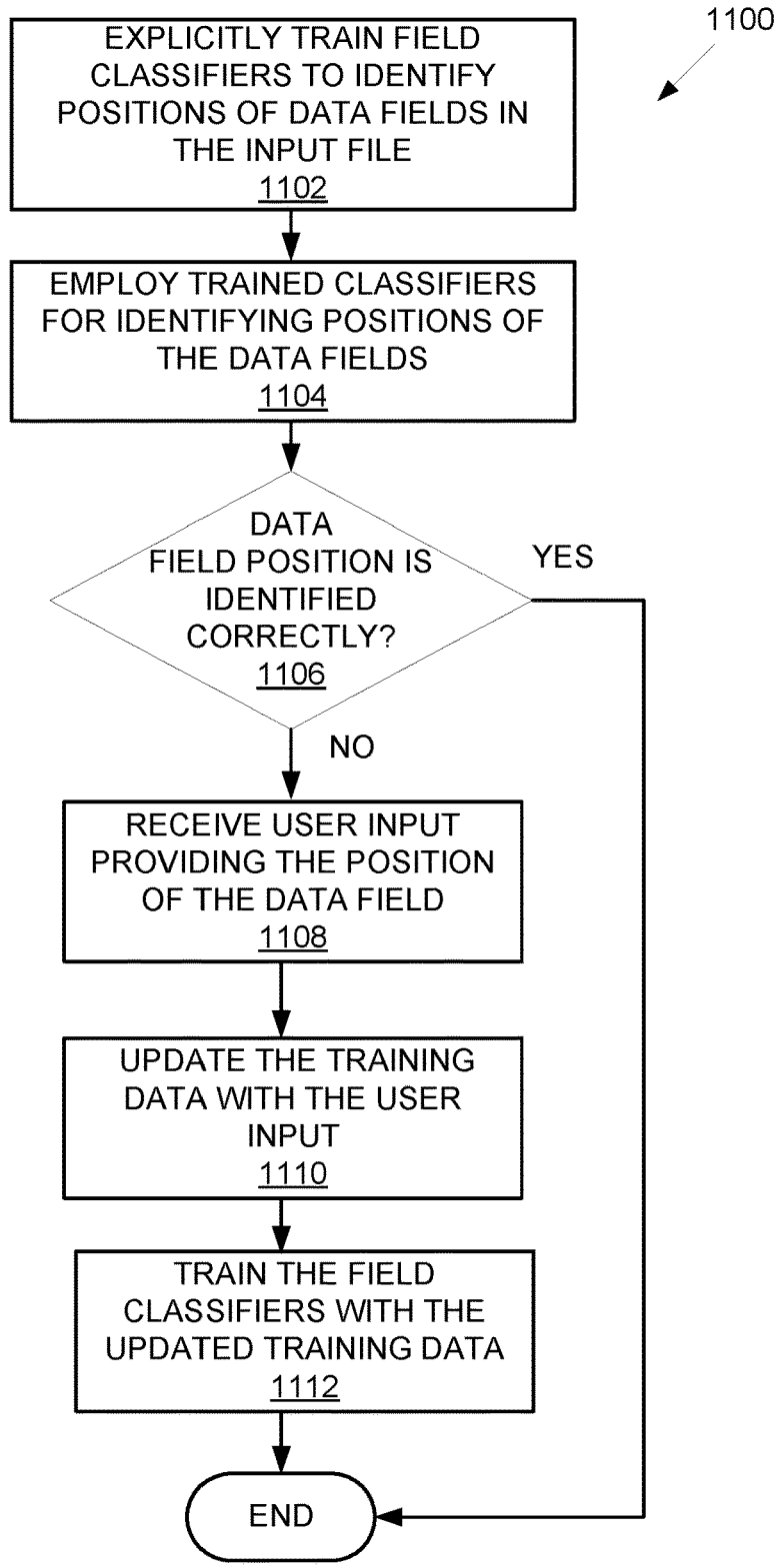
FIG. 11 is a flowchart that details a method of training and using field classifiers in accordance with an example.

FIG. 11 is a flowchart 1100 that details a method of training and using the field classifiers to obtain the position of a data field within a page of the input file 104. Initially at 1102, the field models 108 can be explicitly trained via labeled training data in an example. The field models 108 thus trained are used for identifying data fields within the input file 104. Accordingly at 1104 the field models 108 are employed for identifying data fields and their positions within a page of the input file. For example, the UI 160 may be employed by a user wherein the user selects a data field value to identify its position within the input file 104. At 1106, it is determined if the position of the data field was identified correctly. If position was identified correctly, the method terminates on the end block. If it is determined at 1106 that a position could not be identified for the data field, the user input pointing out the position of the data field within the input file 104 is received at 1108. For example, the user can click on or otherwise select the data field source location within the input file 104. The document processing and validation system 100 can receive the position of the user's click within the input file 104 to train the field models 108. The user input is added to update the training data which will now include the data field and its position as pointed out by the user in the input file at 1110. The field models 108 are trained with the updated training data to point out the position of the data field at 1112 so that when the user subsequently attempts to locate the data field will cause the document processing and validation system 100 to navigate to the position pointed out by the user at 1108. Even as the user employs the document processing and validation system 100 for extraction and validation purposes, the AI elements within the document processing and validation system 100 are trained during the usage so that the document processing and validation system 100 performs better with continued usage.

Figure 12:
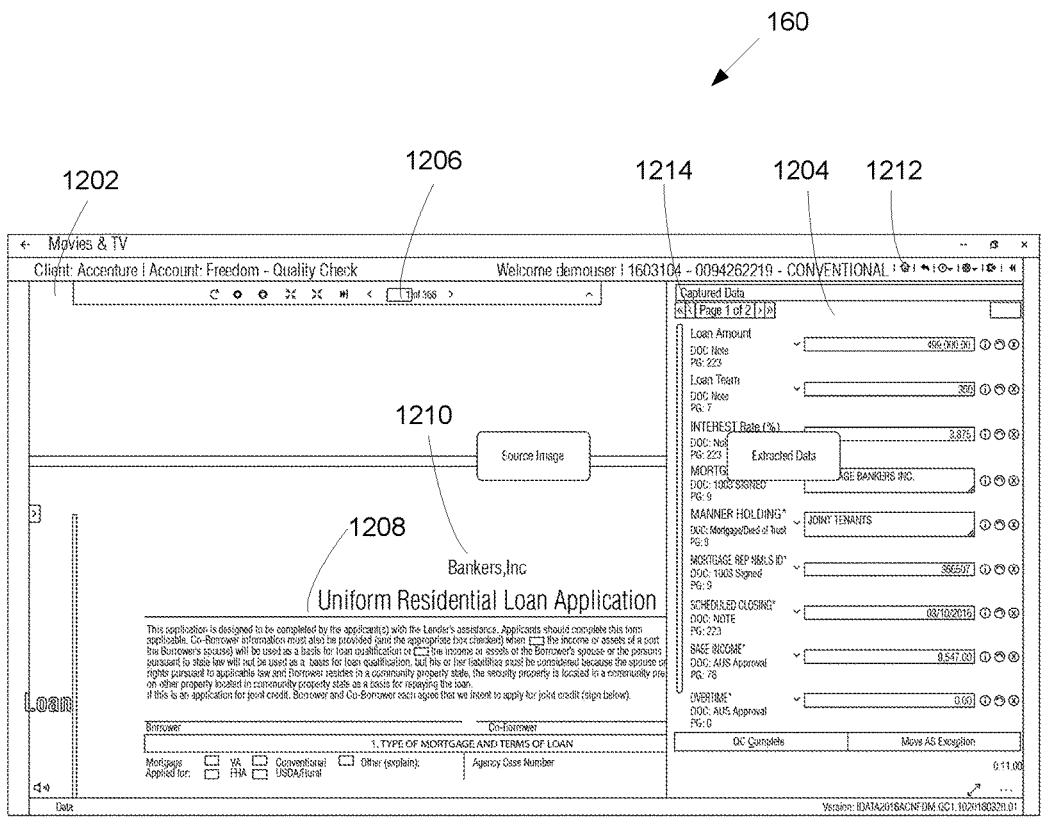
FIG. 12 illustrates a user interface associated with the document processing and validation system in accordance with an example.

The user interfaces are discussed below with reference to an input file 104 corresponding to a loan package. However, it can be appreciated that similar user interfaces, systems and methods discussed herein can be used to process other document images or documents digitized into non-editable formats for extraction and validation of data. FIG. 12 illustrates the UI 160 in accordance with an example. The user interface 160 has two portions—a source image portion 1202 shown on the left hand side (LHS) of the UI 160 and the extracted data portion 1204. The source image portion 1202 displays the input file 104 in the non-editable format such as the scanned image. The extracted data portion displays the data extracted from the source image or the input file 104 on the right hand side (RHS) of the UI 160. The extracted data portion 1204 of the UI 160 also includes a tool bar 1212 that aids navigation to the various screens included in the UI 160. The page navigation control 1214 enables the user to navigate to the various pages within the extracted data portion 1204 which shows the data extracted from the input file 104. As seen from the page number tab 1206 can be displayed on the source image portion 1202, page 1 of 366 pages is displayed wherein a title 1208, "Uniform Residential Loan Application" and the name of the organization 1210 can be used as some of the features for classifying a corresponding root file and retrieving the corresponding document processing rules 122 for extracting and validating the data fields.

Figure 13:
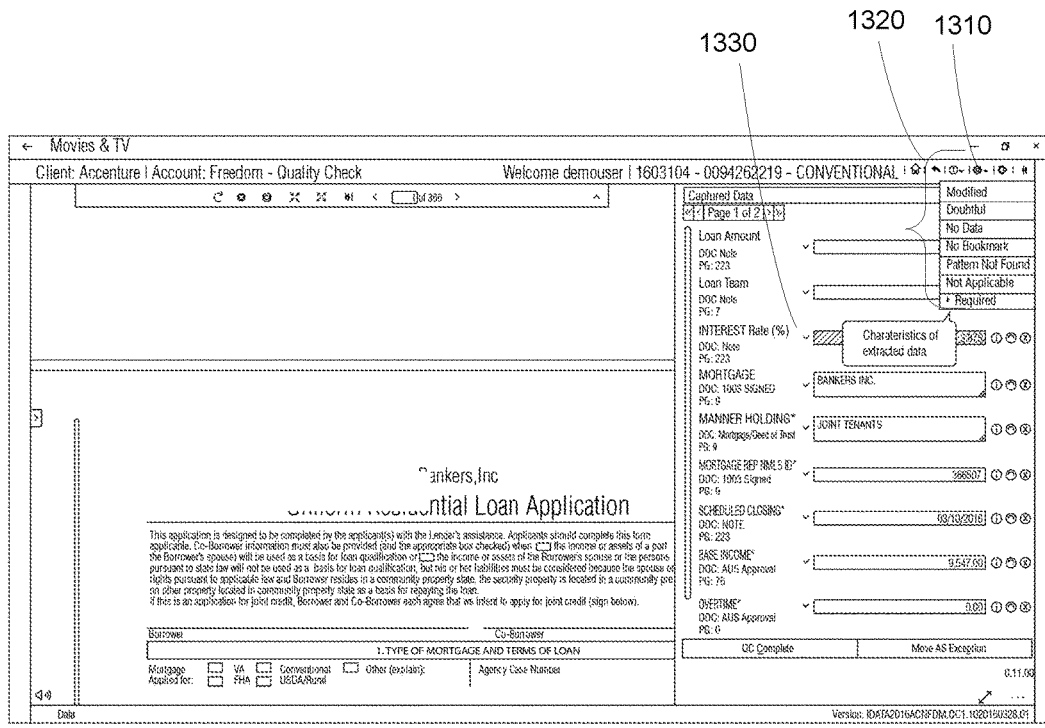
FIG. 13 illustrates color coding for conveying the characteristics of the extracted data in accordance with some examples.

FIG. 13 shows the color coding for conveying the characteristics of the extracted data based on the confidence score of the data fields in accordance with some examples. When an information icon 1310 is clicked, the color coding and the statuses associated with the various colors are shown in a drop-down menu 1320 so that a user may immediately identify the status of data fields which are displayed with the corresponding colors based on their confidence scores as calculated from the validation conditions. The statuses can include but are not limited to modified, doubtful, no data, no bookmark, pattern not found, not applicable and required. In FIG. 13, the data field pertaining to the interest rate 1330 is shown in a textbox on a blue background thereby indicating its status as 'modified'.

Figure 14A:
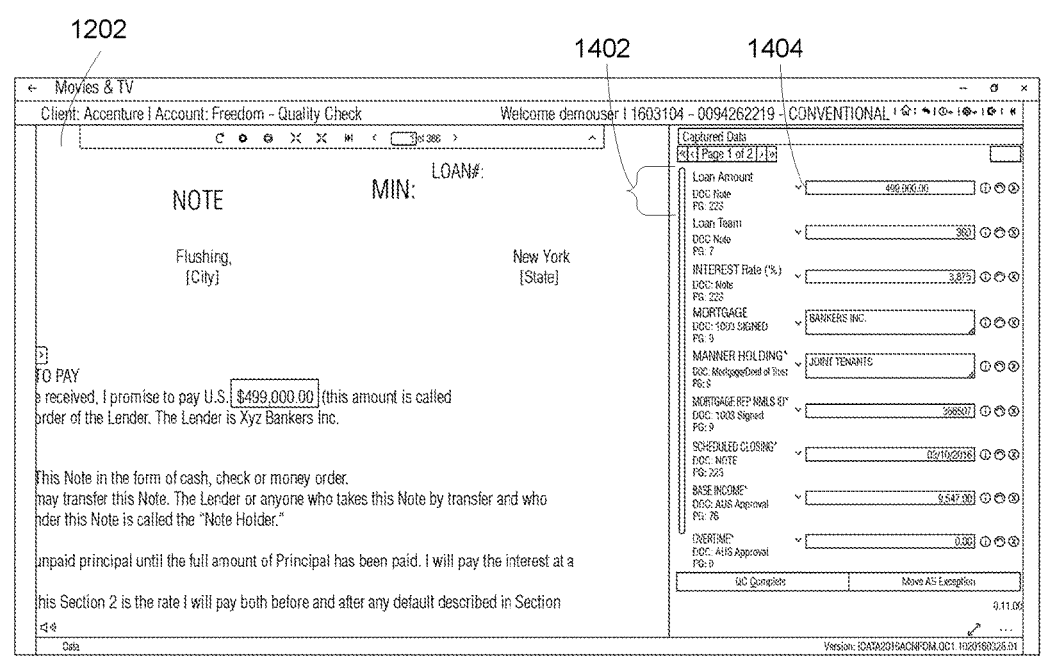
Figure 14B:
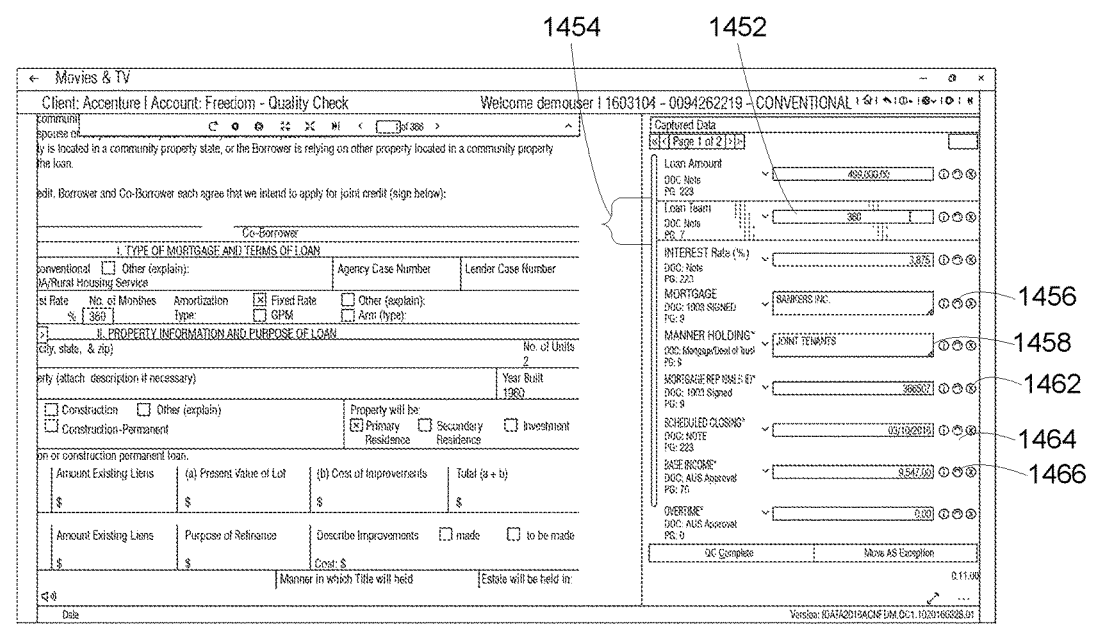

FIGS. 14A and 14B show the document processing and validation system 100 extracting and displaying validated fields from the loan package. In FIG. 14A, the user selects a data field pertaining to loan amount at 1404. The information regarding the position 1402 within the loan package from which the loan amount 1404 was extracted or the source location of the extracted data is provided on the user interface 160. For example, it is given that the value of the loan amount data field is 499,000.00 which is at page 223 of a digitized document title "Note". This is seen from the source image portion 1202 of the UI 160. Hence, when the user selects the loan amount 1404 within the extracted data portion 1204 of the UI 160, the corresponding portion of the "Note" document on page 223 of the loan package is automatically displayed on the source image portion 1202 of the UI 160.

Similarly, FIG. 14B shows the user navigation to the source location 1454 of the loan term 1452 data field at page 7 of the loan package is displayed. Similarly, the UI 160 enables the users to navigate to the source locations of each of the data fields such as the mortgage company name 1456, manner holding 1458, mortgage rep NMLS id 1462, scheduled closing date 1464 and base income 1466 which are extracted from the digitized documents displayed within the source image portion 1202 of the UI 160.

Figure 15A:
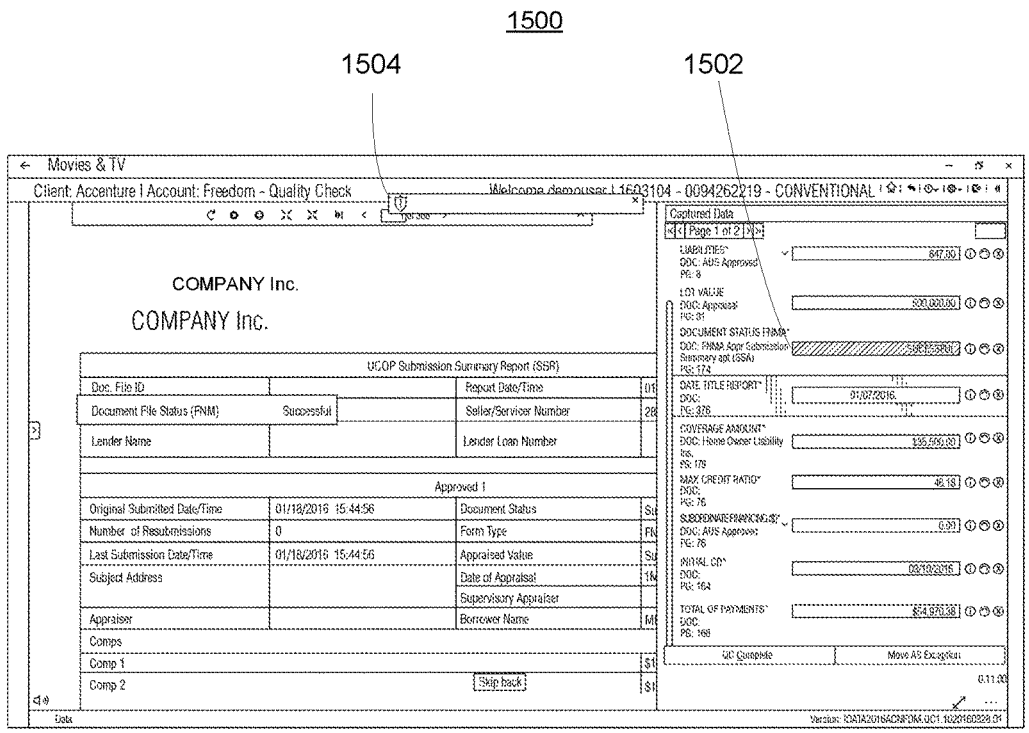
Figure 15B:
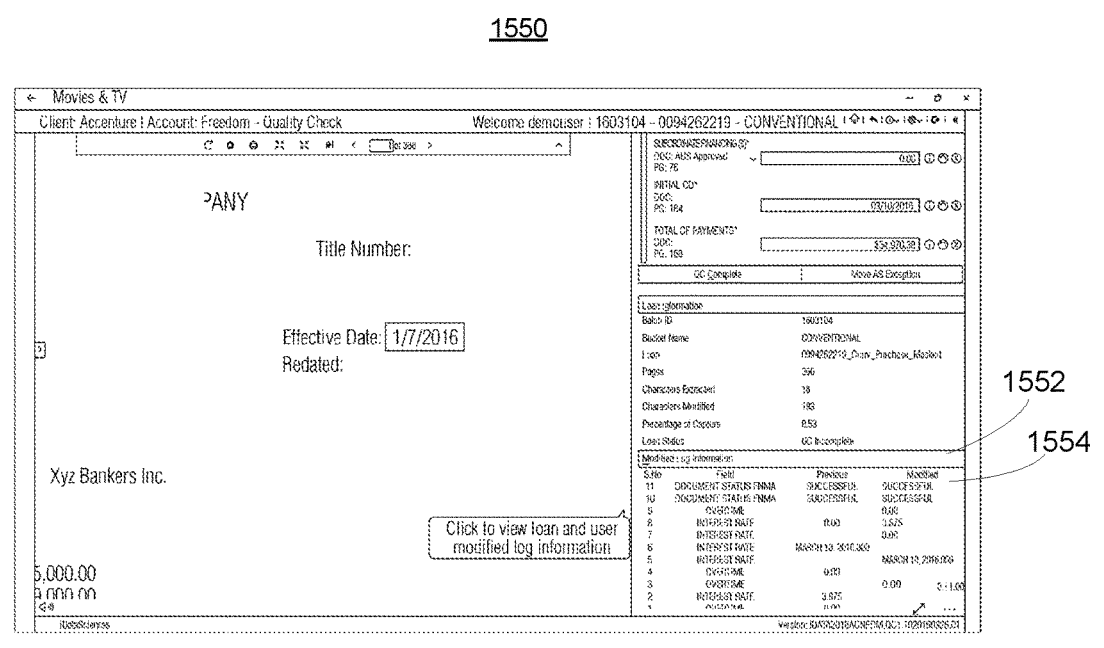

FIGS. 15A and 15B illustrate validation of data fields in accordance with examples described herein. FIG. 15A shows a screen 1500 of the UI 160 wherein the value of the document status FNMA data field 1502 is altered to a new value "Successful1" from "Successful" within the extracted data portion 1204 of the UI 160. Upon receiving the new value of the document status FNMA data field 1502, the document processing and validation system 100 determines that the new value does not comply with one of the document processing rules 122 that the document status FNMA data field 1502 can only receive alphabet values. A notice 1504 to this end is displayed to the user on the UI 160. In response to the notice 1504, the value of the document status FNMA data field 1502 is altered to "Successful". This is shown on the screen 1550 in FIG. 15B wherein a modified log 1552 shows the modification activity on the UI 160 includes an entry 1554 that shows the changes made to the document status FNMA data field 1502.

Figure 16:
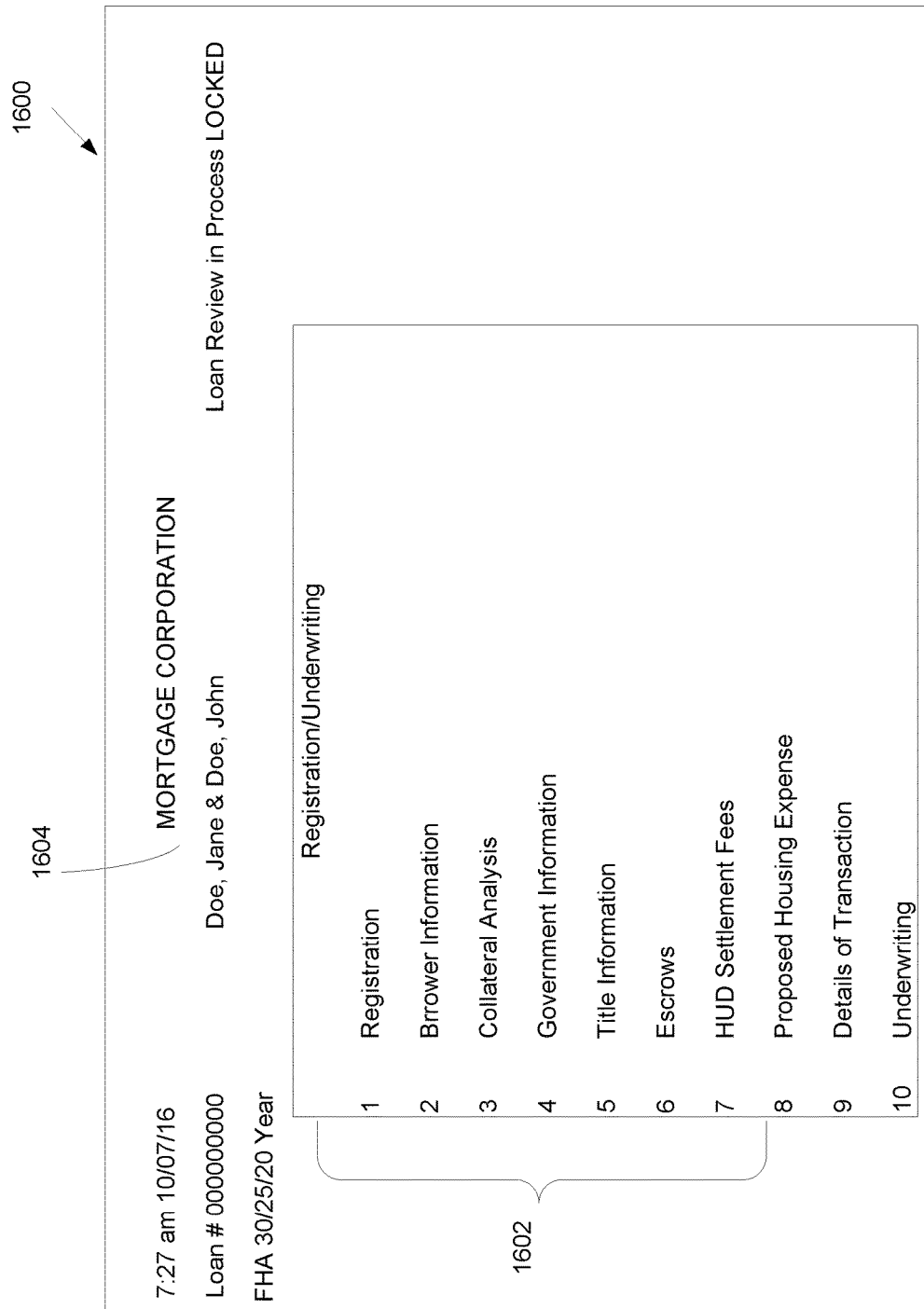
FIG. 16 shows a screen generated in an external system upon upload of the data from the document processing and validation system.

FIG. 16 shows a screen 1600 generated in an external system 180 upon upload of the data from the document processing and validation system. The external system 180 can be for example, a proprietary or private data system of a stakeholder within the loan processing endeavor. The details of the loan package processed by the document processing and validation system 100 are shown in the header 1604. The data from the index structure 150 can be uploaded automatically into the external system 180 and is now classified within the external system 180 under various subsections 1602. It can be appreciated that the screen 1600 and the various subsections are shown only by the way of illustration and not limitation and that a screen with a different layout with more or less subsections may also be used to access validated data in accordance with examples discussed herein.

Figure 17:
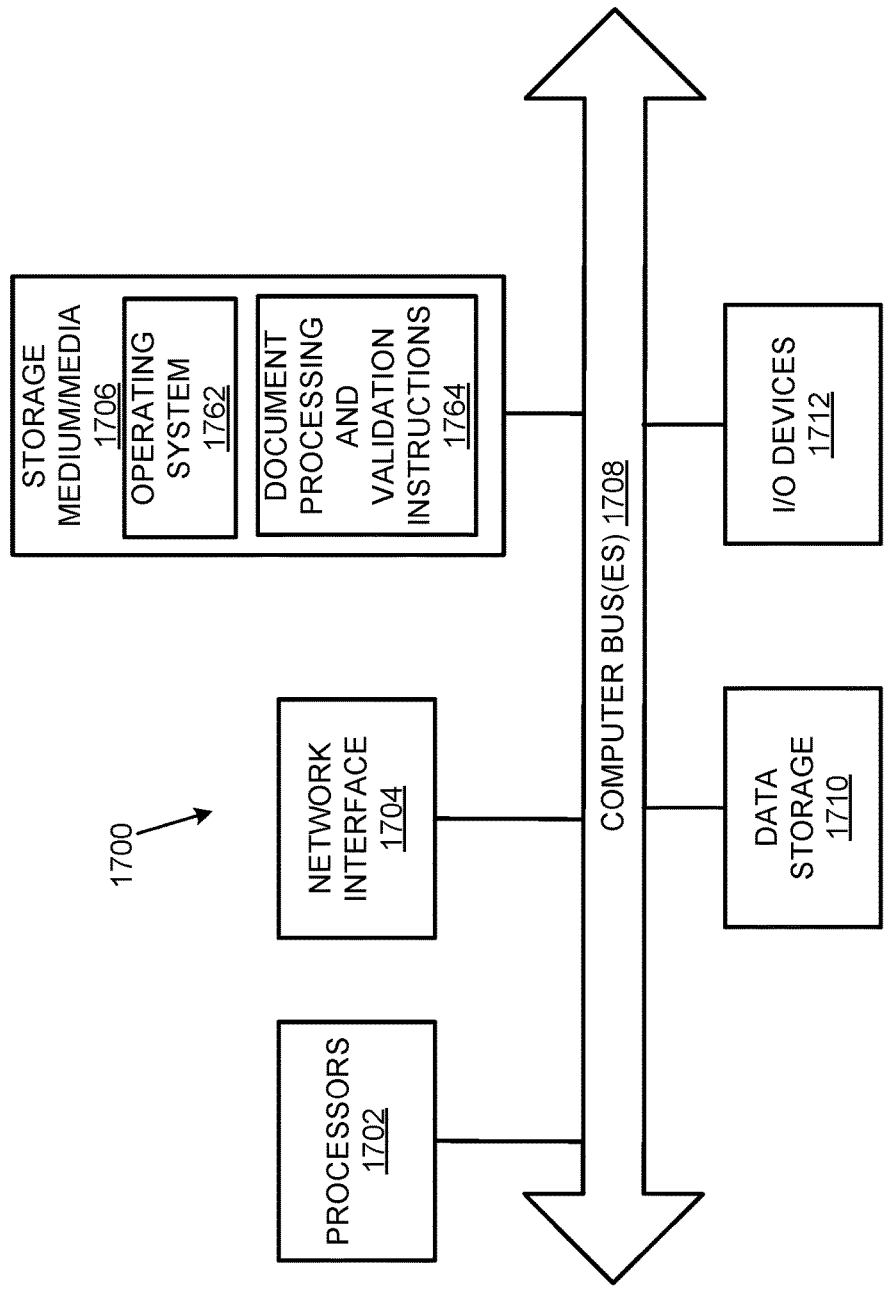
FIG. 17 is a block diagram that illustrates an example of a computer system for implementing the document processing and validation system.

FIG. 17 illustrates a computer system 1700 that may be used to implement the document processing and validation system 100. More particularly, computing machines such as desktops, laptops, smartphones, tablets, wearables which may be used to generate or access the reports may have the structure of the computer system 1700. The computer system 1700 may include additional components not shown and that some of the components described may be removed and/or modified.

The computer system 1700 includes processor(s) 1702, such as a central processing unit, ASIC or other type of processing circuit, input/output devices 1712, such as a display, mouse keyboard, etc., a network interface 1704, such as a Local Area Network (LAN), a wireless 802.11x LAN, a 3G or 4G mobile WAN or a WiMax WAN, and a computer-readable medium 1706. Each of these components may be operatively coupled to a bus 1708. The computer readable medium 1706 may be any suitable medium which participates in providing instructions to the processor(s) 1702 for execution. For example, the computer readable medium 1706 may be non-transitory or non-volatile medium, such as a magnetic disk or solid-state non-volatile memory or volatile medium such as RAM. The instructions or modules stored on the computer readable medium 1706 may include machine readable instructions 1764 executed by the processor(s) 1702 to perform the methods and functions of the document processing and validation system 100.

The document processing and validation system 100 may be implemented as software stored on a non-transitory computer readable medium and executed by one or more processors. For example, the computer readable medium 1706 may store an operating system 1762, such as MAC OS, MS WINDOWS, UNIX, or LINUX, and code or machine readable instructions 1764 for the document processing and validation system 100. The operating system 1762 may be multi-user, multiprocessing, multitasking, multithreading, real-time and the like. For example, during runtime, the operating system 1762 is running and the code for the document processing and validation system 100 is executed by the processor(s) 1702.

The computer system 1700 may include a data storage 1710, which may include non-volatile data storage. The data storage 1710 stores any data used by the document processing and validation system 100. The data storage 1710 may be used to store real-time data from the document data extraction and validation processes to automatically extract data values, validate the values, calculate confidence scores, enable manual reviews of data fields with low confidence scores and the like.

The network interface 1704 connects the computer system 1700 to internal systems for example, via a LAN. Also, the network interface 1704 may connect the computer system 1700 to the Internet. For example, the computer system 1700 may connect to web browsers and other external applications and systems via the network interface 1704.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A system that extracts searchable data from digitized documents comprising:
   one or more processors; and
   a non-transitory data storage comprising instructions that cause the processors to:
   access a root file comprising a plurality of digitized documents that are generated from a plurality of paper documents, wherein the digitized documents comprise one or more of duplicate copies and multiple versions of one or more of the paper documents;
classify the root file under a document type selected from a plurality of document types based on a purpose associated with the paper documents;
select document processing rules in accordance with the classification of the root file;
select a subset of significant documents from the plurality of the digitized documents by excluding the duplicate copies and multiple versions of one or more of the paper documents from the root file such that a unique copy of the one or more paper documents is selected from the root file;
generate an input file comprising the subset of significant documents such that each of the significant documents corresponds to one of the unique copies selected from the root file;
access a list of data fields that are to be identified from the input file from data field information included in the document processing rules;
determine values and locations of one or more of the data fields within the input file based on the data field information;
build an index structure that enables locating the one or more data fields within the input file;
validate at least one of the one or more data fields for which the locations and values are identified from the input file;
enable access to the one or more data fields and the input file via a user interface with controls populated with data from the index structure, the user interface configured to display a source image portion including the input file and an extracted data portion including the controls with the values and the locations of the one or more data fields in the input file, the user interface further configured to display at least a subset of the one or more data fields that have not been validated via a color coding for manual verification;
receive a user selection of one of the controls on the extracted data portion; and
display, in the source image portion, a portion of the input file including one or more of the data fields that correspond to the selected control.

2. The system of claim 1, the instructions to access the root file further comprising instructions that cause the processors to:
receive an image generated in a non-editable format by scanning the plurality of paper documents.

3. The system of claim 1, the instructions to classify the root file further comprising instructions that cause the processors to:
access one or more of images, logos and form layouts associated with the plurality of document types from a data store; and
classify the root file under one of the plurality of document types based on a match between the images, logos and form layouts in the root file and the images, logos and form layouts accessed from the data store.

4. The system of claim 3, the instructions to classify the root file under one of the plurality of document types based on a match further comprising instructions that cause the processors to:
employ document classifiers trained on image processing techniques to identify the match between the images, logos and form layouts in the root file and the images, logos and form layouts accessed from the data store.

5. The system of claim 1, the instructions to select a subset of significant documents from the plurality of the digitized documents further comprising instructions that cause the processors to:
access document processing rules associated with the document type of the root file; and
select the subset of significant documents based on the document processing rules.

6. The system of claim 1, the instructions to determine values and locations of the one or more data fields within the input file further comprising instructions that cause the processors to:
access a plurality of field models respectively corresponding to each of the data fields, each of the plurality of field models including classifiers trained to identify the data fields from the input file; and
obtain a page number and position coordinates within a page identified by the page number of each of the one or more data fields within the input file.

7. The system of claim 6, the instructions to build an index structure further comprising instructions that cause the processors to:
build the index structure that stores for each of the one or more data fields, identity of a respective significant document of the subset of significant documents bearing the data field, a page number of the respective significant document within the input file and the position coordinates of the data field within a page of the respective significant document.

8. The system of claim 1, further comprising instructions that cause the processors to:
receive user input identifying a location of at least one of the data fields within the input file wherein the location of the at least one data field could not be determined.

9. The system of claim 8, the instructions for manual verification further comprising instructions that cause the processors to:
explicitly train a respective field model of the data field on the user input for enabling locating the at least one data field.

10. The system of claim 1, further comprising instructions that cause the processors to:
upload validated data from the index structure to an external system; and
generate a data file within the external system comprising the uploaded data.

11. A method of extracting and validating data comprising:
receiving a root file that comprises a plurality of digitized documents obtained by imaging respective paper documents from a document package;
classifying the root file into one of a plurality of document types based on a purpose associated with the document package;
selecting document processing rules for processing the root file based on the document type under which the root file is classified;
splitting the root file into individual digitized documents based on the document processing rules, the individual digitized documents including multiple versions of at least one document;
selecting a subset of the individual digitized documents to form an input file based on document identification information included in the document processing rules;
extracting data values and positions of one or more of a plurality of data fields comprised in the input file;

calculating respective confidence scores for the one or more data fields, the confidence scores indicating an extent of compliance of the one or more data fields with respective validation conditions;

generating an index structure from the input file, the index structure including the data values, the positions and the confidence scores for each of the one or more data fields;

displaying an image of the input file within a source image portion of a user interface, the user interface having controls populated with the data values from the index structure and the user interface configured to display at least a subset of the one or more data fields that have not been validated via a color coding for manual verification;

displaying within an extracted data portion of the user interface, the controls with the values and positions of the one or more data fields;

receiving a user selection of one of the controls within the extracted data portion; and displaying within the source image portion, a portion of the input file including one or more of the data fields corresponding to the selected control.

12. The method of claim 11, wherein splitting the root file into individual digitized documents further comprises:
identifying each page of the root file;
creating respective folders for each individual document in the root file; and
placing pages of the digitized documents into respective folders.

13. The method of claim 12, wherein selecting a subset of the individual digitized documents to form the input file further comprises:
identifying based on the document identification information, significant documents from the individual digitized documents for data field extraction; and
selecting the pages of the individual digitized documents corresponding to the significant documents; and
generating the input file by placing the selected pages in an order specified by the document processing rules.

14. The method of claim 12, wherein extracting data values and positions of one or more of a plurality of data fields further comprises:
employing trained field classifiers for identifying the positions of the one or more data fields from the input file.

15. The method of claim 14, further comprising:
determining that the field classifiers did not identify positions of at least one of the one or more data fields.

16. The method of claim 15, further comprising:
receiving user input accurately identifying the position of the at least one data field; and
training the field classifiers on the user input to accurately identify the position of the at least one data field.

17. The method of claim 11, wherein displaying a source image portion and an extracted data portion further comprises:
displaying the source image portion adjacent to the extracted data portion on the user interface.

18. A non-transitory computer-readable storage medium comprised in a user device, the computer-readable storage medium comprising machine-readable instructions that cause a processor to:
access a root file comprising a plurality of digitized documents that are generated from a plurality of paper documents, wherein the digitized documents comprise one or more of duplicate copies and multiple versions of one or more of the paper documents;
classify the root file under a document type selected from a plurality of document types based on a purpose associated with the paper documents;
select document processing rules in accordance with the classification of the root file;
select a subset of significant documents from the plurality of the digitized documents by excluding the duplicate copies and multiple versions of the one or more paper documents from the root file such that a unique copy of the one or more paper documents is included in the root file;
generate an input file comprising the subset of significant documents such that each of the subset of significant documents corresponds to a selected version of one of the paper documents;
access a list of data fields that are to be identified from the input file from data field information included in the document processing rules;
determine values and locations of one or more of the data fields within the input file based on the data field information;
build an index structure that enables locating the one or more data fields within the input file;
validate at least one of the one or more data fields for which the locations and values are identified from the input file; and
enable access to the one or more data fields and the input file via a user interface with controls populated with data from the index structure, the user interface configured to display a source image portion including the input file and an extracted data portion including the controls with the values and the locations of the one or more data fields in the input file, the user interface further configured to display at least a subset of the one or more data fields that have not been validated via a color coding for manual verification;
receive a user selection of one of the controls on the extracted data portion; and
display, in the source image portion, a portion of the input file including one or more of the data fields that correspond to the selected control.

* * * * *